(12) United States Patent
Han et al.

(10) Patent No.: US 12,504,857 B2
(45) Date of Patent: Dec. 23, 2025

(54) DISPLAY DEVICE

(71) Applicant: SAMSUNG DISPLAY CO., LTD., Yongin-si (KR)

(72) Inventors: Saehee Han, Yongin-si (KR); Koichi Sugitani, Yongin-si (KR); Gwui-Hyun Park, Yongin-si (KR); Hokyung Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/000,884

(22) Filed: Dec. 24, 2024

(65) Prior Publication Data

US 2025/0278158 A1    Sep. 4, 2025

(30) Foreign Application Priority Data

Feb. 29, 2024  (KR) .................. 10-2024-0029538

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
CPC ..................... G06F 3/0446; G06F 3/0412
See application file for complete search history.

(56) References Cited

U.S. PATENT DOCUMENTS

| | | | |
|---|---|---|---|
| 11,683,970 B2 | 6/2023 | Kim et al. | |
| 11,698,693 B2 | 7/2023 | Kim et al. | |
| 11,925,094 B2 | 3/2024 | Lee et al. | |
| 2018/0373372 A1* | 12/2018 | Kim | G06F 3/0445 |
| 2020/0152708 A1* | 5/2020 | Kim | G06F 3/0443 |
| 2020/0203661 A1 | 6/2020 | Bae | |
| 2022/0406867 A1 | 12/2022 | Choi et al. | |

FOREIGN PATENT DOCUMENTS

| | | |
|---|---|---|
| KR | 10-2021-0143960 A | 11/2021 |
| KR | 10-2021-0147124 A | 12/2021 |
| KR | 10-2022-0089777 A | 6/2022 |
| KR | 10-2022-0169516 A | 12/2022 |
| KR | 10-2486549 B1 | 1/2023 |

\* cited by examiner

*Primary Examiner* — Peter D McLoone
(74) *Attorney, Agent, or Firm* — F. CHAU & ASSOCIATES, LLC

(57) ABSTRACT

A display device includes a display panel. A touch panel is disposed on the display panel and comprises a sensing area and a hole area having a through-hole defined therein. The hole area is surrounded by the sensing area in a plan view. The sensing area includes a first sensor conductive layer disposed on the display panel. A sensing insulating layer is disposed on the first sensor conductive layer. A second sensor conductive layer is disposed on the sensing insulating layer. At least one of the first sensor conductive layer and the second sensor conductive layer includes a mesh opening. The sensing insulating layer includes a siloxane-based polymer. The sensing insulating layer has a dielectric constant in a range of about 2 to about 3.3.

20 Claims, 8 Drawing Sheets

DISPLAY DEVICE

CROSS-REFERENCE TO RELATED APPLICATIONS

This application claims priority under 35 U.S.C. § 119 to Korean Patent Application No. 10-2024-0029538, filed on Feb. 29, 2024 in the Korean Intellectual Property Office, the disclosure of which is incorporated by reference in its entirety herein.

1. TECHNICAL FIELD

Embodiments of the present disclosure relate to a display panel and a display device including the display panel.

2. DISCUSSION OF RELATED ART

Various multimedia devices include display devices to provide images to a user through a display screen. Examples of such multimedia devices include televisions, mobile phones, tablets, navigation devices and game consoles. A display device may provide a touch-based input method that allows a user to intuitively and conveniently input information or commands.

The display device may include a display panel that generates an image, a touch panel that senses a user's touch, and an electronic module. Examples of the electronic module include a camera, an infrared sensor and a proximity sensor. The electronic module may be disposed below the display panel and the touch panel. A through-hole through which the electronic module is exposed may be provided in the display panel and the touch panel.

SUMMARY

The present disclosure provides a display device including a touch panel having improved RC delay and increased touch sensitivity.

According to an embodiment of the present inventive concept, a display device includes a display panel. A touch panel is disposed on the display panel and comprises a sensing area and a hole area having a through-hole defined therein. The hole area is surrounded by the sensing area in a plan view. The sensing area includes a first sensor conductive layer disposed on the display panel. A sensing insulating layer is disposed on the first sensor conductive layer. A second sensor conductive layer is disposed on the sensing insulating layer. At least one of the first sensor conductive layer and the second sensor conductive layer includes a mesh opening. The sensing insulating layer includes a siloxane-based polymer. The sensing insulating layer has a dielectric constant in a range of about 2 to about 3.3.

In an embodiment, the sensing insulating layer may have a thickness in a range of about 1 μm to about 5 μm.

In an embodiment, the sensing area may further include a base insulating layer disposed between the display panel and the first sensor conductive layer.

In an embodiment, the sensing insulating layer may be disposed on the display panel in the hole area. The second sensor conductive layer is disposed on the sensing insulating layer in the hole area. The second sensor conductive layer in the hole area may include the mesh opening.

In an embodiment, the hole area may further include a base insulating layer that is directly disposed between the display panel and the sensing insulating layer.

In an embodiment, the second sensor conductive layer may be directly disposed on the sensing insulating layer.

In an embodiment, the touch panel may further include a cover insulating layer disposed on the second sensor conductive layer, and the cover insulating layer may include a same material as the sensing insulating layer.

In an embodiment, the first sensor conductive layer may include first sensing patterns. Each of the first sensing patterns is disposed in a first direction. The first sensor conductive layer may include second sensing patterns. Each of the second sensing patterns is disposed in a second direction crossing the first direction.

In an embodiment, the display panel may include a display area corresponding to the sensing area of the touch panel, and the display panel may include a light emitting element in the display area.

According to an embodiment of the present inventive concept, a display device includes a display panel. A touch panel is disposed on the display panel. The touch panel includes a sensing area and a hole area having a through-hole defined therein. The hole area is surrounded by the sensing area in a plan view. The hole area comprises a sensing insulating layer disposed on the display panel. A second sensor conductive layer is disposed on the sensing insulating layer. The second sensor conductive layer includes a mesh opening. The sensing insulating layer includes a siloxane-based polymer. The sensing insulating layer has a dielectric constant in a range of about 2 to about 3.3.

In an embodiment, the hole area may further include a base insulating layer directly disposed between the display panel and the sensing insulating layer.

In an embodiment, a first sensor conductive layer may be disposed on the display panel in the sensing area. The sensing insulating layer is disposed on the first sensor conductive layer in the sensing area. The second sensor conductive layer is disposed on the sensing insulating layer in the sensing area. At least one of the first sensor conductive layer or the second sensor conductive layer may include a mesh opening in the sensing area.

In an embodiment, the sensing insulating layer of the sensing area may have a thickness in a range of about 1 μm to about 5 μm.

In an embodiment, the sensing area may further include a base insulating layer disposed between the display panel and the first sensor conductive layer.

In an embodiment, the first sensor conductive layer may include first sensing patterns and second sensing patterns. Each of the first sensing patterns is disposed in a first direction. Each of the second sensing patterns is disposed in a second direction crossing the first direction.

In an embodiment, the second sensor conductive layer may be directly disposed on the sensing insulating layer.

In an embodiment, the touch panel may further include a cover insulating layer disposed on the second sensor conductive layer, and the cover insulating layer may include a same material as the sensing insulating layer.

In an embodiment, the display panel may include a display area corresponding to the sensing area of the touch panel, and the display panel may include a light emitting element in the display area.

According to an embodiment of the present inventive concept, a display device includes a display panel. A touch panel is disposed on the display panel. The touch panel includes a sensing area and a hole area having a through-hole defined therein. The hole is surround by the sensing area in a plan view. The touch panel includes a base insulating layer. First and second sensing patterns are disposed on the base insulating layer. Each of the first sensing patterns is disposed in a first direction. Each of the second sensing patterns is disposed in a second direction crossing the first direction. First connection patterns connecting the first sensing patterns to each other are disposed between the base insulating layer and the first sensing patterns. Second connection patterns connecting the second sensing patterns to each other are disposed on the base insulating layer. A sensing insulating layer is disposed between the base insulating layer, and the first sensing patterns, the second sensing patterns and the second connection patterns. The first sensing patterns, the second sensing patterns, and the second connection patterns are disposed in the sensing area and the hole area. The first connection patterns are disposed in the sensing area. The sensing insulating layer includes a siloxane-based polymer. The sensing insulating layer has a dielectric constant in a range of about 2 to about 3.3.

In an embodiment, the touch panel may further include a cover insulating layer disposed on the second sensor conductive layer, and the cover insulating layer may include a same material as the sensing insulating layer.

BRIEF DESCRIPTION OF THE DRAWINGS

The accompanying drawings are included to provide a further understanding of embodiments of the present inventive concept, and are incorporated in and constitute a part of this specification. The drawings illustrate non-limiting embodiments of the present inventive concept and, together with the description, serve to explain principles of the present inventive concept. In the drawings.

DETAILED DESCRIPTION OF EMBODIMENTS

Figure 1:
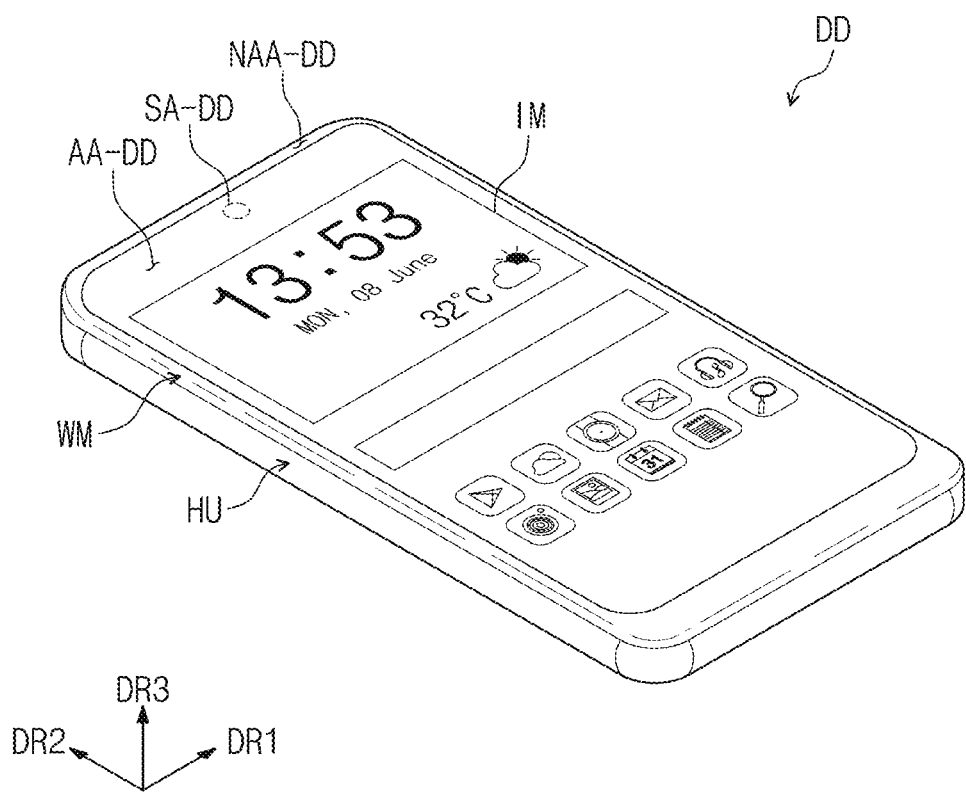
FIG. 1 is a coupling perspective view of a display device according to an embodiment of the present inventive concept.

Since the present inventive concept may have diverse modified embodiments, non-limiting embodiments are illustrated in the drawings and are described in the detailed description of the present inventive concept. However, this does not limit the present inventive concept to the described embodiments and it should be understood that the present inventive concept covers all the modifications, equivalents, and replacements within the idea and technical scope of the present inventive concept.

In this specification, the terms of a singular form may include plural defines unless referred to the contrary.

In this specification, it is to be understood that terms such as "include" or "have" are intended to designate that a feature, number, process, operation, component, part, or combination thereof described in the specification exists, but does not preclude the possibility of addition or existence of one or more other features, numbers, processes, operations, components, parts, or combinations thereof.

In this specification, it will also be understood that when one component (or region, layer, portion) is referred to as being "on", "connected to", or "coupled to" another component, it can be directly disposed/connected/coupled on/to the one component, or an intervening third component may also be present. When one component (or region, layer, portion) is referred to as being "directly on", "directly connected to", or "directly coupled to" another component, no intervening components may be present.

In this specification, "under", "below", "above", "upper", and the like are used for explaining relation association of the elements illustrated in the drawings. The terms may be a relative concept and described based on directions expressed in the drawings.

In this specification, the term "disposed on" may refer to a case in which it is disposed on a lower portion as well as an upper portion of any one member.

In this specification, "being directly disposed" may mean that there is no layer, film, area, plate, or the like between a portion of the layer, the film, the area, the plate, or the like and the other portion. For example, "being in direct contact" may mean being disposed without using" additional member such and an adhesion member between two layers or two members.

In this specification, the term "and/or" includes any and all combinations of one or more of the associated elements.

In this specification, it will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the scope of the appended claims.

Unless otherwise defined, all terms (including technical and scientific terms) used herein have the same meaning as commonly understood by a person of ordinary skill in the art to which the present inventive concept belongs. In addition, terms such as those defined in commonly used dictionaries should be interpreted as having a meaning consistent with the meaning in the context of the related technology, and unless explicitly defined here, the terms should not be interpreted as too ideal or too formal sense.

Like reference numerals refer to like elements throughout. Also, in the figures, the thickness, ratio, and dimensions of components may be exaggerated for clarity of illustration.

Hereinafter, a display device according to an embodiment of the present inventive concept will be described with reference to the accompanying drawings.

Figure 2:
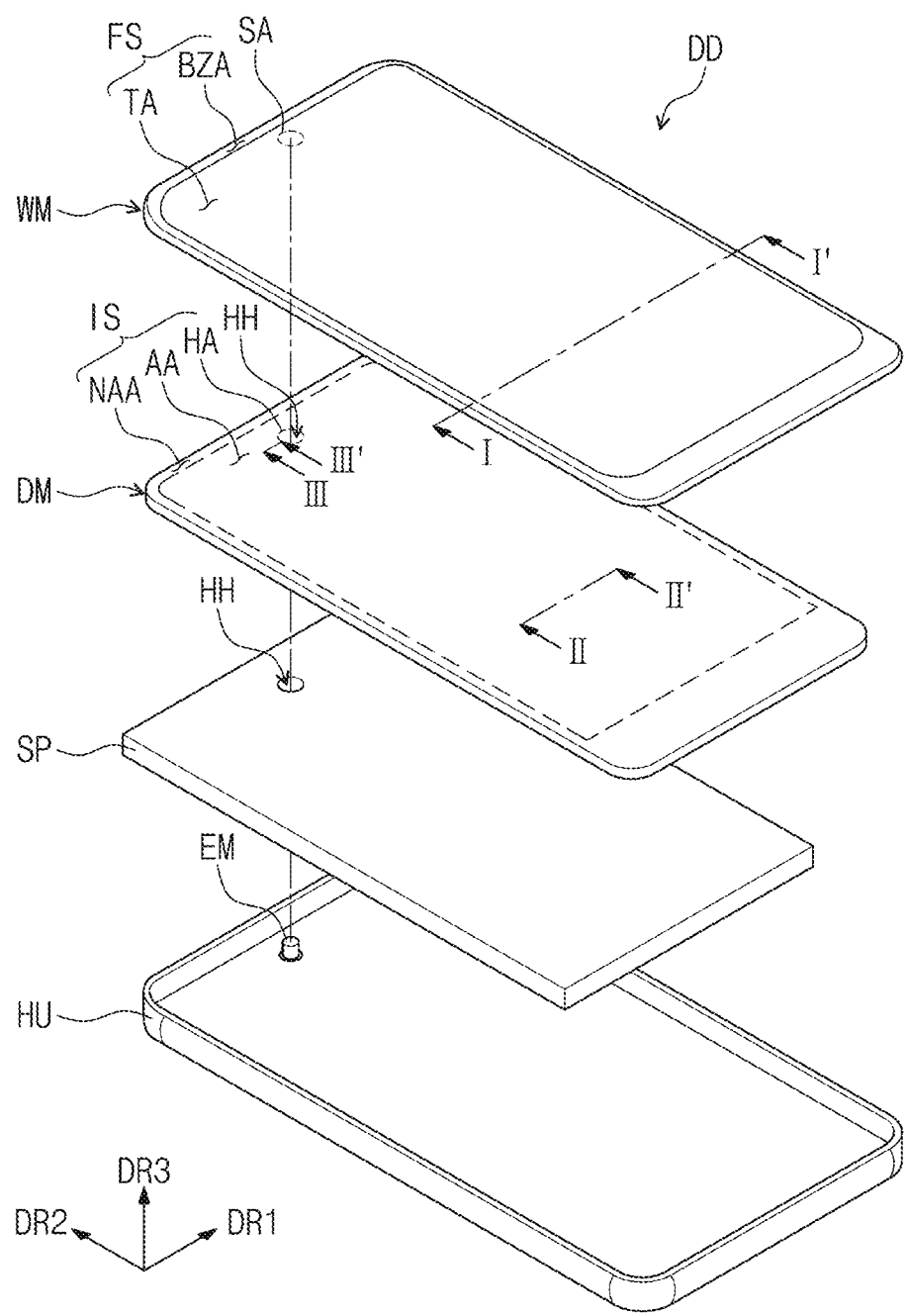
FIG. 2 is an exploded perspective view of the display device according to an embodiment of the present inventive concept.
Figure 3:
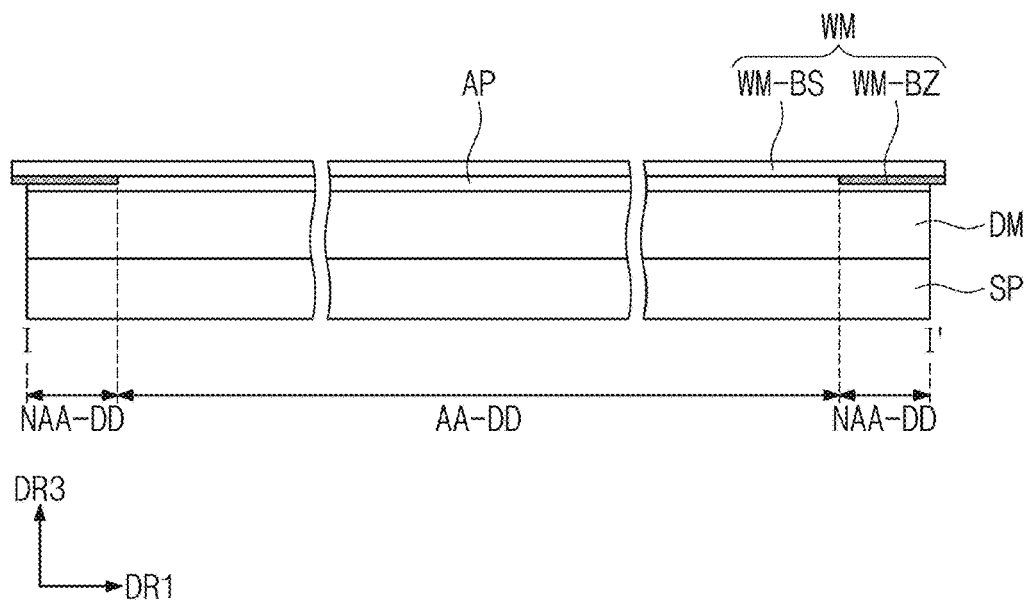
FIG. 3 is a cross-sectional view of the display device according to an embodiment of the present inventive concept.

FIG. 1 is a coupling perspective view of a display device according to an embodiment of the present inventive concept. FIG. 2 is an exploded perspective view of the display device according to an embodiment of the present inventive concept. FIG. 3 is a cross-sectional view of the display device according to an embodiment of the present inventive concept. FIG. 3 is a schematic cross-sectional view of a portion corresponding to a line I-I' of FIG. 2.

A display device DD according to an embodiment may be a device that is activated according to an electrical signal. For example, in an embodiment the display device DD may be a television, an external billboard, a monitor, a mobile phone, a tablet PC, a car navigation system, a game console, or a wearable device. However, embodiments of the present inventive concept are not necessarily limited thereto. FIG. 1 illustrates an example in which the display device DD is a mobile phone.

The display device DD according to an embodiment may include an active area AA-DD and a peripheral area NAA-DD surrounding the active area AA-DD (e.g., in a plan view). The active area AA-DD of the display device DD may display an image IM. The image IM may include a still image as well as a dynamic image. In FIG. 1, the image IM is illustrated as software application icons and a clock, temperature and calendar window. However embodiments of the present inventive concepts are not necessarily limited thereto and the image IM may be various different subject matter. The active area AA-DD of the display device DD according to an embodiment may be a portion corresponding to a display area AA of a display module DM, and the peripheral area NAA-DD may be a portion corresponding to a non-display area NAA of the display module DM. In an embodiment, the active area AA-DD of the display device DD may be a portion corresponding to a transmission area TA of a window WM, and the peripheral area NAA-DD may be a portion corresponding to a bezel area BZA of the window WM.

The display device DD may display the image IM in a direction of a third directional axis DR3 on a display surface parallel to a plane defined by first and second directional axes DR1 and DR2. The display surface on which the image IM is displayed may correspond to a front surface of the display device DD and also correspond to a front surface FS of the window WM. In addition, in an embodiment the display device DD may have a solid shape having a predetermined thickness in the direction of the third directional axis DR3 that is perpendicular to the plane defined by the first directional axis DR1 and the second directional axis DR2.

In this embodiment, the front surface (e.g., a top surface) or a rear surface (e.g., a bottom surface) of each of members may be defined based on a direction in which the image IM is displayed. The front and rear surfaces may be opposite to each other in the third directional axis DR3. A normal direction of each of the front and rear surfaces may be parallel to the third directional axis DR3. However, the directions indicated as the first to third directional axes DR1, DR2, and DR3 may be a relative concept and thus changed into different directions. Hereinafter, the first to third directions may be directions indicated by the first to third directional axes DR1, DR2, and DR3 and designated by the same reference numerals, respectively.

The electronic device DD may sense an external input applied from the outside (e.g., the external environment). The external input may include various types of inputs such as force, a pressure, a temperature, and light. In an embodiment, the external input may be, for example, a touch input by the user's hand applied to the front surface of the display device DD. However, the external input may include all inputs that are capable of changing a capacitance of the touch panel TP (see FIG. 4). An area of the display device DD that senses the external input may not necessarily be limited to the front surface of the display device DD, and the display device DD may sense the external input of the user, which is applied to the side or rear surface of the display device DD.

In an embodiment, the active area AA-DD may have a quadrangular shape parallel to a plane defined by the first direction axis DR1 and the second direction axis DR2. However, this is merely an example. For example, the active area AA-DD may have various shapes and is not necessarily limited to a specific embodiment.

The peripheral area NAA-DD may be a light blocking area, such as an area that is disposed outside the active area AA-DD to surround the active area AA-DD (e.g., in a plan view). In an embodiment, the peripheral area NAA-DD may be disposed on a side surface of the display device DD rather than the front surface of the display device DD. However, embodiments of the present inventive concept are not necessarily limited thereto. For example, in an embodiment, the peripheral area NAA-DD may be omitted.

A sensing area SA-DD may be defined in the active area AA-DD of the display device DD according to an embodiment. Although FIG. 1 illustrates one sensor area SA as an example, the number of sensing areas SA is not necessarily limited thereto.

An electronic module EM may be disposed on an area overlapping the sensing area SA-DD (e.g. in the third direction DR3). In an embodiment, the electronic module EM may receive an external input transmitted through the sensing area SA-DD and/or provide an output through the sensing area SA-DD.

The display device DD according to an embodiment may be a flexible display device. The "flexible" display device means a bendable or otherwise deformable property and may include a structure that is completely folded to a few nanometers. For example, the display device DD may be a curved display device, a rollable display device, a slidable display device, or a foldable display device. In addition, in some embodiments the display device DD may be rigid and may not have flexible portions.

The display device DD according to an embodiment may include an electronic module EM and a display module DM disposed on the electronic module EM (e.g., in the third direction DR3). The display device DD according to an embodiment may include the window WM disposed on the display module DM (e.g., in the third direction DR3). In addition, the display device DD according to an embodiment may include a support member SP and/or a housing HU, which are disposed below the display module DM. In the display device DD of FIGS. 1 and 2 according to an embodiment, the window WM and the housing HU may be coupled to each other to define an outer appearance of the display device DD. In an embodiment, a through-hole HH may be defined in the support member SP and the display module DM to overlap the electronic module EM (e.g., in the third direction DR3).

In the display device DD according to an embodiment, the window WM may be disposed on the display module DM (e.g., in the third direction DR3). The window WM may include a base substrate WM-BS and a bezel pattern WM-BZ surrounding the base substrate WM-BS (e.g., in a plan view).

The base substrate WM-BS may be a substrate including an optically transparent insulating material. The base substrate WM-BS may have ductility. For example, in an embodiment the base substrate WM-BS may include a polymer film, a substrate including a polymer material, or a thin glass substrate. In an embodiment, functional layers such as an anti-reflection layer, an anti-fingerprint layer, and an optical layer for controlling a phase may be further disposed on the base substrate WM-BS.

In an embodiment, the bezel pattern WM-BZ may be a color layer printed on one surface of the base substrate WM-BS or a color layer deposited on the base substrate WM-BS. For example, the bezel pattern WM-BZ may have a multilayered structure. The multilayered structure may include a colored layer and/or a black light blocking layer. In an embodiment, the colored color layer and the black light blocking layer may be formed through deposition, printing, and coating processes. In some embodiments, the bezel pattern WM-BZ may be omitted or may be disposed on functional layers other than the base substrate WM-BS. In some embodiments, the bezel pattern WM-BZ may be disposed only at one side of the transmission area TA or may be omitted.

The window WM includes a front surface FS that is exposed to the outside (e.g., the external environment). The transmission area TA of the window WM may be an optically transparent area. The transmission area TA may have a shape corresponding to the display area AA of the display module DM. For example, the transmission area TA overlaps an entire surface or at least a portion of the display area AA. An image displayed on the display area AA of the display module DM, such as image IM in FIG. 1, may be visible through the transmission area TA from the outside.

The bezel area BZA of the window WM may be disposed adjacent to the transmission area TA to surround the transmission area TA (e.g., in a plan view). The bezel area BZA may cover the non-display area NAA of the display module DM to prevent the non-display area NAA from being visible from the outside. The sensing area SA may be defined in the transmission area TA of the window WM. The sensing area SA of the window WM may be defined as a sensing area SA-DD of the display device DD.

The display device DD according to an embodiment may include at least one adhesive layer AP. In an embodiment, the adhesive layer AP may include a transparent adhesive such as an optically clear adhesive film (OCA), an optically clear adhesive resin (OCR), or a pressure sensitive adhesive film (PSA). In the display device DD according to some embodiments, unlike that illustrated in FIG. 3, the adhesive layer AP may be omitted.

In the display device DD according to an embodiment, the electronic module EM may be an electronic component that outputs or receives an optical signal. For example, in an embodiment the electronic module EM may be a camera module that photographs an external image. Also, in an embodiment the electronic module EM may be a sensor module such as a proximity sensor or an infrared light emitting sensor.

In the display device DD according to an embodiment, the display module DM may be disposed on the electronic module EM (e.g., in the third direction DR3). The display module DM may include a display area AA and a non-display area NAA adjacent to the display area AA. For example, the front surface IS of the display module DM may include the display area AA and the non-display area NAA. The display area AA may be an area that is activated according to an electrical signal.

The non-display area NAA may be adjacent to the display area AA (e.g., in the first and/or second directions DR1, DR2). In an embodiment, the non-display area NAA may surround the display area AA (e.g., in a plan view). A driving circuit or driving line for driving the display area AA, various signal lines or pads providing an electrical signal to the display area AA, or electronic elements may be disposed on the non-display area NAA.

In the display module DM according to an embodiment, the hole area HA may be defined in the display area AA. A through-hole HH passing through the display panel DP (see FIG. 4) and the touch panel TP (see FIG. 4) of the display module DM may be defined in the hole area HA. The hole area HA may correspond to the sensing area SA-DD of the display device DD. The through-hole HH defined in each of the display panel DP (see FIG. 4) and the touch panel TP (see FIG. 4) may overlap the electronic module EM (e.g., in the third direction DR3).

In an embodiment, the support member SP disposed below the display module DM may include a cushion layer and/or a metal support layer. The through-hole HH may be defined in the support member SP. The through-hole HH may be defined to correspond to the hole area HA of the display module DM. The through-hole HH may be a portion corresponding to the sensing area SA-DD of the display device DD.

The electronic module EM may overlap the through-hole HH (e.g., in the third direction DR3). In an embodiment, at least a portion of the electronic module EM may be inserted and disposed in the through-hole HH.

The window WM and the housing HU may be coupled to each other to define an outer appearance of the display device DD. The window WM and the housing HU may be coupled to define an internal space that accommodates components such as the display module DM. For example, the display module DM, the support member SP, the electronic module EM, etc. may be accommodated in the internal space.

The housing HU may include a material having relatively high rigidity. For example, in an embodiment the housing HU may include glass, plastic, or a metal or may include a plurality of frames and/or plates made of a combination of glass, plastic, and a metal. The housing HU may protect the display module DM accommodated in the housing HU by absorbing an impact applied from the outside or preventing foreign substances/moisture from being permeated from the outside.

Figure 4:
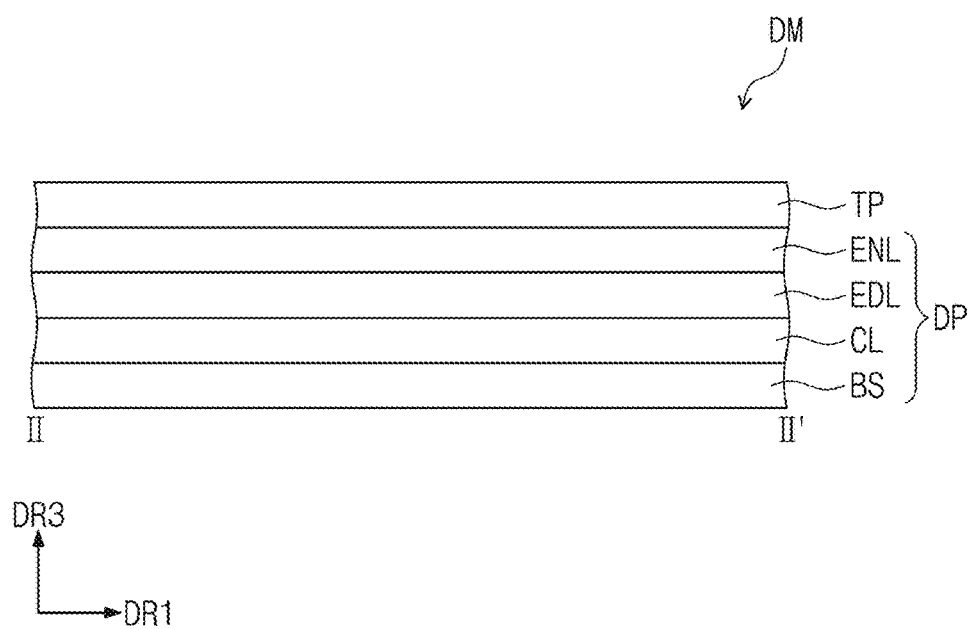
FIG. 4 is a cross-sectional view of a display module according to an embodiment of the present inventive concept.

FIG. 4 is a cross-sectional view illustrating a portion of the display module according to an embodiment of the present inventive concept. FIG. 4 is a cross-sectional view illustrating a portion corresponding to a line II-II' of FIG. 2.

The display module DM according to an embodiment may include a display panel DP and a touch panel TP disposed on the display panel DP (e.g., disposed directly thereon in the third direction DR3). In an embodiment, the display panel DP may include a base layer BS, a circuit layer CL disposed on the base layer BS, a light emitting element layer EDL disposed on the circuit layer CL, and an encapsulation layer ENL disposed on the light emitting element layer EDL. The touch panel TP may be disposed on the encapsulation layer ENL (e.g., disposed directly thereon in the third direction DR3). The encapsulation layer ENL may cover the light emitting element layer EDL.

The base layer BS may provide a base surface on which the light emitting element layer EDL is disposed. In an embodiment, the base layer BS may include a glass substrate, a metal substrate, a polymer substrate, and the like. However, embodiments of the present inventive concept are not necessarily limited thereto. For example, the base layer BS may be an inorganic layer, an organic layer, or a composite layer.

The base layer BS may have a multi-layered structure. For example, in an embodiment the base layer BS may have a three-layered structure constituted by a synthetic resin layer, an adhesive layer, and a synthetic resin layer. For example, in an embodiment the synthetic resin layer may include a polyimide-based resin. In an embodiment, the synthetic resin layer may include at least one of an acrylate-based resin, a methacrylate-based resin, a polyisoprene-based resin, a vinyl-based resin, an epoxy-based resin, an urethane-based resin, a cellulose-based resin, a siloxane-based resin, a polyamide-based resin, or a perylene-based resin. In this specification, the "~~-based" resin means as including a functional group of "~~".

The circuit layer CL may be disposed on the base layer BS (e.g., disposed directly thereon in the third direction DR3). In an embodiment, the circuit layer CL may include an insulating layer, a semiconductor pattern, a conductive pattern, and a signal line. In an embodiment, the insulating layer, the semiconductor layer, and the conductive layer may be disposed on the base layer BS in a manner such as coating or deposition, and then, the insulating layer, the semiconductor layer, and the conductive layer may be selectively patterned through a plurality of photolithography processes. Thereafter, the semiconductor pattern, the conductive pattern, and the signal line included in the circuit layer CL may be provided. A configuration of the circuit layer CL will be described in detail later.

The light emitting element layer EDL may be disposed on the circuit layer CL (e.g., disposed directly thereon in the third direction DR3). The light emitting element layer EDL may include a light emitting element ED (see FIG. 8). For example, in an embodiment the light emitting element layer EDL may be an organic light emitting element, an inorganic light emitting element, a quantum dot light emitting element, a micro LED light emitting element, a nano LED light emitting element, a quantum dot light emitting element, an electrophoretic element, an electrowetting element or the like. However, embodiments of the present inventive concept are not necessarily limited thereto and the light emitting elements may vary as long as light is generated, or an amount of light is controlled according to electrical signals.

The light emitting element ED (see FIG. 8) of the light emitting element layer EDL may be disposed on the display area AA (see FIG. 2). In an embodiment, the light emitting element may not be disposed on the non-display area NAA. In addition, the light emitting element may not be disposed on the hole area HA (see FIG. 2).

The encapsulation layer ENL may be disposed on the light emitting element layer EDL (e.g., disposed directly thereon in the third direction DR3). In an embodiment, the encapsulation layer ENL may include at least one inorganic layer and at least one organic layer. For example, in an embodiment the encapsulation layer ENL may include an inorganic layer, an organic layer, and an inorganic layer, which are sequentially laminated (e.g., in the third direction DR3). However, embodiments of the present inventive concept are not necessarily limited thereto and the layers constituting the encapsulation layer ENL may vary.

The touch panel TP may be disposed on the display panel DP (e.g., in the third direction DR3). The touch panel TP may sense an external input applied from the outside. In an embodiment, the external input may be a user's input. For example, in an embodiment, the user's input may include various types of external inputs such as a portion of user's body, light, heat, a pen, a pressure, or the like.

In an embodiment, the touch panel TP may be disposed on the display panel DP through a continuous process. In this embodiment, the touch panel TP may be expressed as being directly disposed on the display panel DP. The direct disposition may mean that a third component is not disposed between the touch panel TP and the display panel DP. For example, a separate adhesive member may not be disposed between the touch panel TP and the display layer DP (e.g., in the third direction DR3). For example, the touch panel TP may be directly disposed on the encapsulation layer ENL.

Figure 5A:
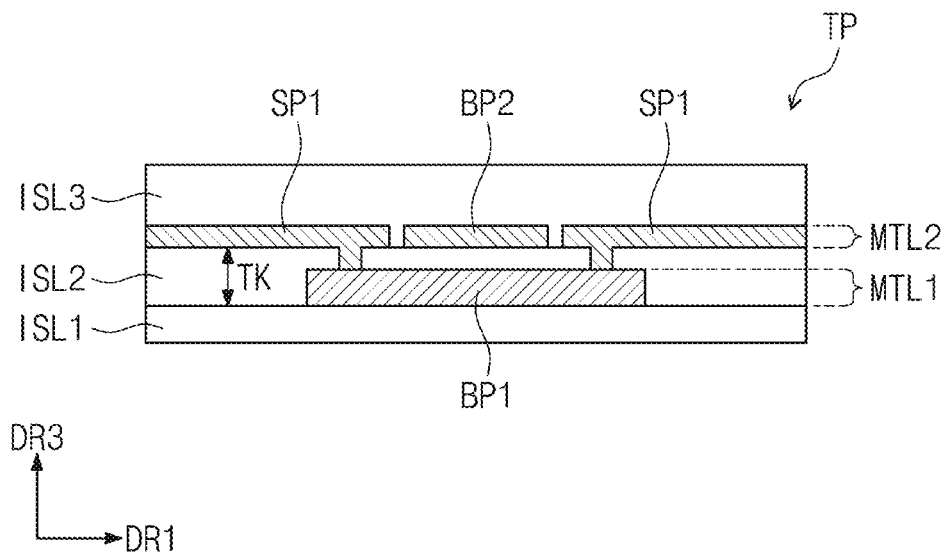
FIGS. 5A and 5B are cross-sectional views of a touch panel according to embodiments of the present inventive concept.
Figure 5B:
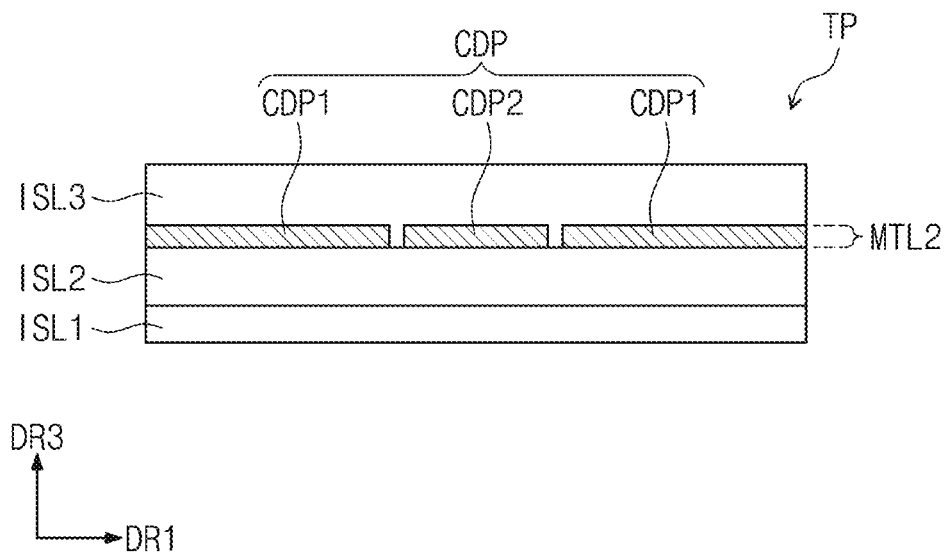

FIGS. 5A and 5B are cross-sectional views of the touch panel according to embodiments of the present inventive concept.

FIG. 5A schematically illustrates a cross-section of the touch panel TP corresponding to the display area AA (see FIG. 2) of the display module DM (see FIG. 2), and FIG. 5B schematically illustrates a cross-section of the touch panel TP corresponding to the hole area HA (see FIG. 2) of the display module DM (see FIG. 2). More specifically, FIG. 5A schematically illustrates a cross-section of a sensing area AA-S (see FIG. 6) of the touch panel TP, and FIG. 5B schematically illustrates a cross-section of the hole area HA (see FIG. 6) of the touch panel TP. In an embodiment, the hole area HA may be surrounded by the sensing area AA-S (FIG. 6) in a plan view.

Referring to FIG. 5A, in an embodiment the sensing area AA-S (see FIG. 6) of the touch panel TP may include a base insulating layer ISL1, a first sensor conductive layer MTL1, a sensing insulating layer ISL2, a second sensor conductive layer MTL2, and a cover insulating layer ISL3.

Referring to FIG. 5B, in an embodiment the hole area HA (see FIG. 6) of the touch panel TP may include a base insulating layer ISL1, a sensing insulating layer ISL2, a second sensor conductive layer MTL2, and a cover insulating layer ISL3.

Referring to FIGS. 5A and 5B together, the base insulating layer ISL1 may be disposed on the encapsulation layer ENL (see FIG. 4) of the display panel DP (see FIG. 4). In an embodiment, the base insulating layer ISL1 may be directly disposed on the encapsulation layer ENL (see FIG. 4) of the display panel DP (see FIG. 4). The base insulating layer ISL1 may be provided integrally with the sensing area AA-S (see FIG. 6) and the hole area HA (see FIG. 6) of the touch panel TP.

The base insulating layer ISL1 may include an inorganic layer. In an embodiment, the inorganic layer may include at least one of aluminum oxide, titanium oxide, silicon oxide, silicon nitride, silicon oxynitride, zirconium oxide, or hafnium oxide.

The first sensor conductive layer MTL1 may be disposed on the base insulating layer ISL1 (e.g., in the third direction DR3). The first sensor conductive layer MTL1 may be directly disposed on the base insulating layer ISL1. In an embodiment, the first sensor conductive layer MTL1 may be disposed only on the sensing area AA-S (see FIG. 6) of the touch panel TP and may not be disposed on the hole area HA (see FIG. 6).

The first sensor conductive layer MTL1 may include at least one of patterns included in first and second sensing electrodes TEL and TE2 (see FIG. 6), which will be described later. For example, in an embodiment the first sensor conductive layer MTL1 may include first connection patterns BP1 (see FIG. 6), or the first sensor conductive layer MTL1 may include first sensing patterns SP1 (see FIG. 6). 6), second sensing patterns SP2 (see FIG. 6), and second connection patterns BP2 (see FIG. 6). FIG. 5A illustrates an embodiment in which the first sensor conductive layer MTL1 includes the first connection patterns BP1.

The first sensor conductive layer MTL1 may have a single-layered structure or a multilayered structure in which a plurality of layers are laminated in the third direction DR3.

The conductive layer having the single-layered structure may include a metal layer or a transparent conductive layer. In an embodiment, the metal layer may be formed of molybdenum, silver, titanium, copper, aluminum, and an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymers such as PEDOT, metal nanolines, graphene or the like. The conductive layer having the multilayer structure may include multilayer metal layers. In an embodiment, the multilayer metal layers may have a three-layer structure of titanium/aluminum/titanium. The conductive layer having the multilayered structure may include at least one metal layer and at least one transparent conductive layer.

The sensing insulating layer ISL2 may be disposed on the base insulating layer ISL1 (e.g., disposed directly thereon in the third direction DR3). In the sensing area AA-S (see FIG. 6), the sensing insulating layer ISL2 may cover at least a portion of the patterned first sensor conductive layer MTL1 and may be disposed on the base insulating layer ISL1. In FIG. 5A, the sensing insulating layer ISL2 may cover a portion of side and top surfaces of the first connection patterns BP1, and contact holes may be defined in the sensing insulating layer ISL2 so that the first sensing patterns SP1 extend through the contact holes and are directly connected to the first connection electrodes BP1. In an embodiment, in the sensing area AA-S (see FIG. 6), a thickness TK of the sensing insulating layer ISL2 may be in a range of about 1 μm to about 5 μm.

In the hole area HA (see FIG. 6), the sensing insulating layer ISL2 may be disposed directly on the base insulating layer ISL1 (e.g., in the third direction DR3). In FIG. 5B, a thickness of the sensing insulating layer ISL1 in the hole area HA (see FIG. 6) may be illustrated as being constant. However, embodiments of the present inventive concept are not necessarily limited thereto. For example, in the hole area HA (see FIG. 6), the sensing insulating layer ISL1 may cover a stepped portion occurring by the display panel DP (see FIG. 4) disposed below the touch panel TP and thus may be disposed to have difference thicknesses. In an embodiment, the sensing insulating layer ISL1 in the sensing area AA-S (see FIG. 6) and the hole area HA (see FIG. 6) may be provided integrally and may have a flat top surface.

The sensing insulating layer ISL2 may be an organic layer. Thus, as described above, the sensing insulating layer ISL2 may be provided integrally with the sensing area AA-S (see FIG. 6) and the hole area HA (see FIG. 6). For example, the sensing insulating layer ISL2 may be formed in the sensing area AA-S (see FIG. 6) and the hole area HA (see FIG. 6) in one process to increase processability. In addition, in an embodiment the sensing insulating layer ISL2 may cover (e.g., planarize) the stepped portion caused by the display panel DP (see FIG. 8) disposed below the touch panel TP. In addition, the sensing insulating layer ISL2 may have superior characteristics in covering a side surface of the first sensor conductive layer MTL1 on the sensing area AA-S (see FIG. 6) when compared to a comparative embodiment in which the sensing insulating layer ISL2 is made of an inorganic film. For example, even if the thickness of the first sensor conductive layer MTL1 increases to reduce resistance, the sensing insulating layer ISL2 may cover the side surface of the first sensor conductive layer MTL1 without any empty space, thereby preventing short circuit between the first sensor conductive layer MTL1 and the second sensor conductive layer MTL2 from occurring. The thickness of the first sensor conductive layer MTL1 may increase to reduce RC delay.

In an embodiment, the sensing insulating layer ISL2 may include a siloxane-based polymer. For example, the sensing insulating layer ISL2 may be made of an inorganic material containing a siloxane-based binder and a curable organic material. The sensing insulating layer ISL2 may be formed by curing an inorganic material containing a siloxane-based binder, a curable organic material, and a photosensitive material. The inorganic material containing the siloxane-based binder may have, for example, a cyclic structure or a cage structure. A cyclic structure or a cage structure may have a high percentage of empty space. For example, an acrylic-based or epoxy-based organic material may be applied as the curable organic material.

In an embodiment, a dielectric constant of the sensing insulating layer ISL2 may be in a range of about 2 to about 3.3. In this specification, the dielectric constant may be a value measured at about 1 kHz. The sensing insulating layer ISL2 may have a lower dielectric constant compared to a comparative embodiment in which the sensing insulating layer ISL2 is made of an inorganic film. Thus, a capacitance between the first sensor conductive layer MTL1 and the second sensor conductive layer MTL2 may be reduced to increase touch sensitivity of the touch panel TP.

Table 1 below shows measured contact resistance between the first sensor conductive layer and the second sensor conductive layer depending on the sensing insulating layer material. In Embodiment 1, a sensing insulating layer (having a thickness of about 20000 Å) containing a siloxane-based polymer having a dielectric constant of about 2.95 was applied, and in Comparative Example 1, a sensing insulating layer (having a thickness of about 3000 Å) containing silicon nitride having a dielectric constant of about 7.1 was applied. In Embodiment 1 and Comparative Example 1, resistance values were measured in the second sensor conductive layer and the cover insulating layer, respectively.

TABLE 1

|  | Resistance measured at first sensor conductive layer (Ω) | Resistance measured at cover insulating layer (Ω) |
| --- | --- | --- |
| Embodiment 1 | 0.24 | 0.16 |
| Comparative Example 1 | 7.66 | 6.03 |

Referring to Table 1, it is seen that contact resistance of Embodiment 1, in which an organic film containing a siloxane-based polymer having a low dielectric constant is applied to the sensing insulating layer, is very low compared to contact resistance of Comparative Example 1, which includes an inorganic film having a high dielectric constant.

The second sensor conductive layer MTL2 may be disposed on the sensing insulating layer ISL2 (e.g., in the third direction DR3). The second sensor conductive layer ISL2 may be disposed directly on the sensing insulating layer ISL2. In an embodiment, the second sensor conductive layer MTL2 may be disposed on both the sensing area AA-S (see FIG. 6) and the hole area HA (see FIG. 6) of the touch panel TP. The second sensor conductive layer MTL1 may be disposed on a flat surface planarized by the sensing insulating layer ISL2.

The second sensor conductive layer MTL2 may include at least one of patterns included in the first and second sensing electrodes TEL and TE2 (see FIG. 6), which will be described later. For example, in an embodiment the second sensor conductive layer MTL2 may include first sensing patterns SP1 (see FIG. 6), second sensing patterns SP2 (see FIG. 6), and second connection patterns BP2 (see FIG. 6). Alternatively, in an embodiment the second sensor conductive layer MTL2 may include first connection patterns BP1 (see FIG. 6). FIG. 5A illustrates an embodiment in which the second sensor conductive layer MTL2 includes the first sensing patterns SP1, the second sensing patterns SP2, and the second connection patterns BP2.

Figure 6:
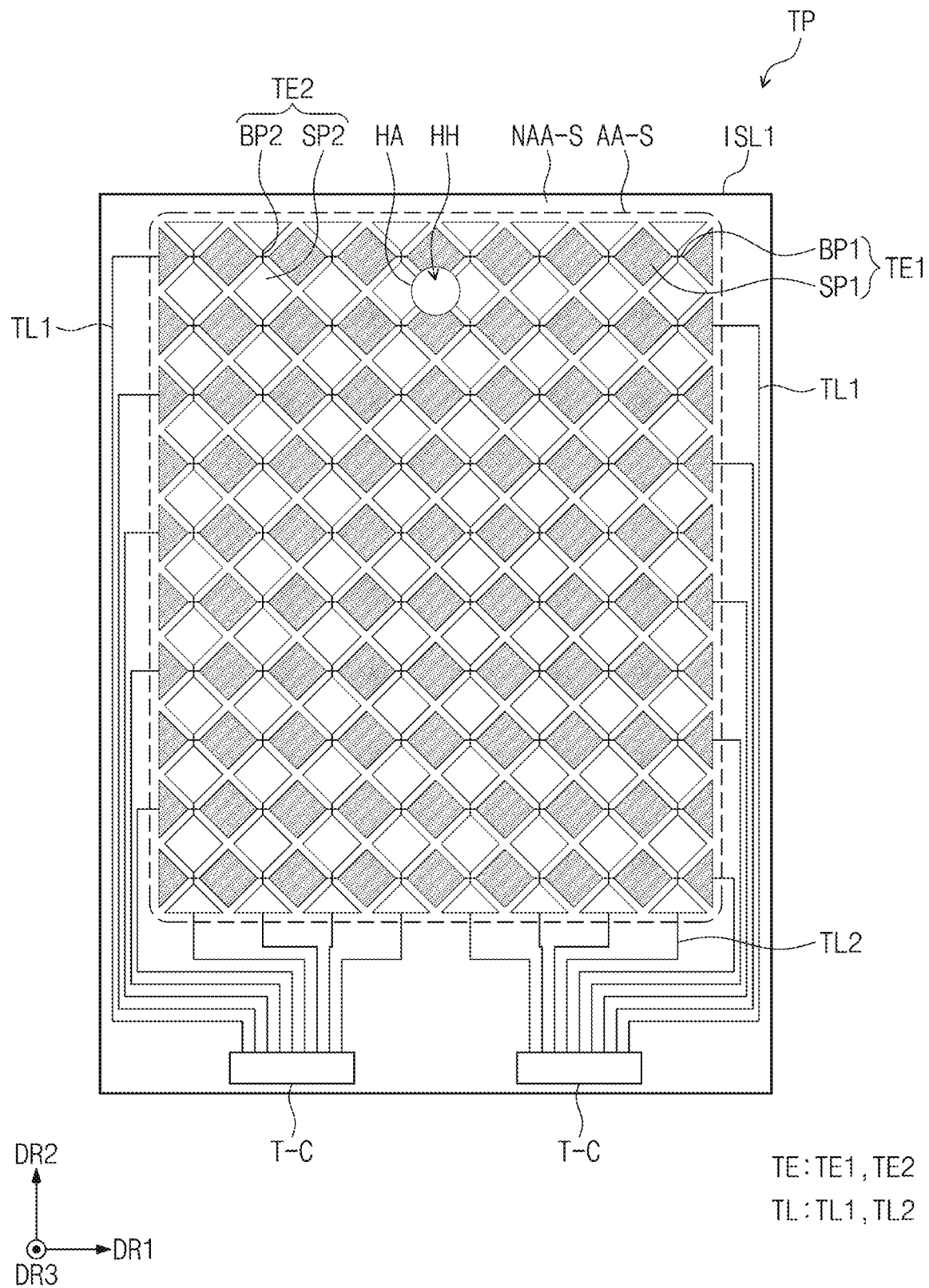
FIG. 6 is a plan view of the touch panel according to an embodiment of the present inventive concept.

The second sensor conductive layer MTL2 may include cutting inspection patterns CDP in the hole area HA (see FIG. 6). In an embodiment, the cutting inspection patterns CDP may be disposed in the same pattern as the second sensor conductive layer (MTL2) of the sensing area AA-S (see FIG. 6), include the same material, and may be formed by the same process except the cutting inspection patterns CDP are disposed in the hole area HA (see FIG. 6) on a plane. For example, in FIG. 5B, although the cutting inspection patterns CDP are illustrated as including first cutting inspection patterns CDP1 and second cutting inspection patterns CDP2, the first cutting inspection patterns CDP1 may be disposed in the same pattern as the first sensing patterns SP1 of FIG. 5A, and the second cutting inspection patterns CDP2 may be disposed in the same pattern as the second connection patterns BP2 of FIG. 5A. In addition, in an embodiment the second sensor conductive layer MTL2 may include the same patterns as the second sensing patterns SP2 (see FIG. 6) of the sensing area AA-S (see FIG. 6) in the hole area HA (see FIG. 6). As the cutting inspection pattern CDP is disposed in the hole area HA (see FIG. 6), cutting for forming the through-hole HH (see FIG. 2) may be confirmed.

Unlike illustrated in FIGS. 5A and 5B, the first sensor conductive layer MTL1 may include the first and second sensing patterns SP1 and SP2 (see FIG. 6) and the second connection patterns BP2. In an embodiment in which the second sensor conductive layer MTL2 includes the first connection patterns BP1, the second sensor conductive layer MTL2 in the hole area HA (see FIG. 6) may include a cutting inspection patterns CDP disposed in the same pattern as the first connection patterns BP1 of the sensing area AA-S (see FIG. 6).

The second sensing conductive layer MTL2 may have a single-layered structure or a multilayered structure in which a plurality of layers are laminated in the third direction DR3. The conductive layer having the single-layered structure may include a metal layer or a transparent conductive layer. In an embodiment, the metal layer may be formed of molybdenum, silver, titanium, copper, aluminum, and an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymers such as PEDOT, metal nanolines, graphene or the like. The conductive layer having the multilayer structure may include multilayer metal layers. In an embodiment, the multilayer metal layers may have a three-layer structure of titanium/aluminum/titanium. The conductive layer having the multilayered structure may include at least one metal layer and at least one transparent conductive layer.

The cover insulating layer ISL3 may be disposed on the second sensor conductive layer MTL2 (e.g., in the third direction DR3). The cover insulating layer ISL3 may be disposed directly on the second sensor conductive layer MTL2. The cover insulating layer ISL3 may cover the second sensor conductive layer MTL2 while being filled into spaced portions generated by patterning the second sensor conductive layer MTL2. In an embodiment, the cover insulating layer ISL3 may be provided integrally with the sensing area AA-S (see FIG. 6) and the hole area HA (see FIG. 6) of the touch panel TP.

The cover insulating layer ISL3 may be an organic layer. In an embodiment, the cover insulating layer ISL3 may include a siloxane-based polymer. In an embodiment, a dielectric constant of the cover insulating layer ISL3 may be in a range of about 2 to about 3.3. In an embodiment, the cover insulating layer ISL3 may include the same material as the sensing insulating layer ISL2. As the cover insulating layer ISL3 is made of the same material as the sensing insulating layer ISL2, processability may be increased.

FIG. 6 is a plan view of the touch panel TP according to an embodiment of the present inventive concept.

Referring to FIG. 6, the touch panel TP may include a sensing area AA-S and a non-sensing area NAA-S adjacent to the sensing area AA-S (e.g., in the first and/or second directions DR1, DR2). The sensing area AA-S may correspond to the active area AA-DD (see FIG. 1) of the display device DD (see FIG. 1). The sensing area AA-S may be an area on which the sensing electrodes TE of the touch panel TP are disposed to sense an external input. The non-sensing area NAA-S may correspond to the peripheral area NAA-DD (see FIG. 1) of the display device DD (see FIG. 1). The non-sensing area NAA-S may be an area on which elements or lines for driving the sensing electrodes TE disposed on the sensing area AA-S are disposed.

In an embodiment, the touch panel TP may include sensing electrodes TE, trace lines TL, and a sensing controller T-C disposed on the sensor base layer ISL1.

The sensing electrodes TE may include first sensing electrodes TE1 and second sensing electrodes TE2 that cross each other on a plane and are electrically insulated from each other. The touch panel TP may acquire information about the external input through a change in mutual capacitance between the first and second sensing electrodes TE1 and TE2.

Each of the first sensing electrodes TE1 may extend in the first direction DR1, and the first sensing electrodes TE1 may be arranged in the second direction DR2. The first sensing electrodes TE1 may be provided in a plurality of rows arranged in the second direction DR2. FIG. 6 illustrates 10 first sensing electrodes TE1 as an example. However, embodiments of the present inventive concept are not necessarily limited thereto and the number of first sensing electrodes TE1 included in the touch panel TP may vary.

Each of the second sensing electrodes TE2 may extend in the second direction DR2, and the second sensing electrodes TE2 may be arranged in the first direction DR1. The second sensing electrodes TE2 may be provided in a plurality of columns arranged in the first direction DR1. FIG. 6 illustrates 8 second sensing electrodes TE2. However, embodiments of the present inventive concept are not necessarily limited thereto and the number of second sensing electrodes TE2 included in the touch panel TP may vary.

Each of the first sensing electrodes TE1 may include first sensing patterns SP1 and first connection patterns BP1. The first sensing patterns SP1 may be arranged in the first direction DR1. The first connection patterns BP1 may connect the first sensing patterns SP1 adjacent to each other in the first direction DR1. The first connection patterns BP1 may be disposed on a layer different from that on which the first sensing patterns SP1 are disposed and may be connected to the corresponding first sensing patterns SP1 through contact holes. In an embodiment, the first sensing patterns SP1 spaced apart from each other in the first direction DR1 may be electrically connected to each other through the first connection patterns BP1. The first connection patterns BP1 disposed on the layer different from that on which the first sensing patterns SP1 are disposed to electrically connect the first sensing patterns SP1 to each other may be defined as bridge patterns. However, embodiments of the present inventive concept are not necessarily limited thereto as long as the first connection patterns BP1 electrically connect the first sensing patterns SP1 adjacent to each other.

Each of the second sensing electrode TE2 may include second sensing patterns SP2 and second connection patterns BP2. The second sensing patterns SP2 may be arranged in the second direction DR2. The second connection patterns BP2 may connect the second sensing patterns SP2 adjacent to each other in the second direction DR2. The second connection patterns BP2 may be disposed on the same layer as the second sensing patterns SP2 and may have an integrated shape extending from the second sensing patterns SP2 on the plane. In an embodiment, the second sensing patterns SP2 and the second connection patterns BP2 may be patterns provided by patterning the same conductive layer through the same process.

In an embodiment, the first sensing patterns SP1, the second sensing patterns SP2, and the second connection patterns BP2 may be disposed on the same layer as each other. The first connection patterns BP1 may be disposed on a layer different from that on which the first sensing patterns SP1 are disposed. For example, the first sensing patterns SP1, the second sensing patterns SP2, and the second connection patterns BP2 may be included in the second sensor conductive layer MTL2 (see FIG. 8), and the first connection patterns BP1 may be included in the first sensor conductive layer MTL1 (see FIG. 8). However, embodiments of the present inventive concept are not necessarily limited thereto, and the second sensing patterns SP2 and the second connection patterns BP2 may be included in the first sensor conductive layer MTL1 (see FIG. 8). For example, in some embodiments the first connection patterns BP1 may be included in the second sensor conductive layer MTL2 (see FIG. 8). Alternatively, in an embodiment, the first sensing patterns SP1, the first connection patterns BP1, and the second sensing patterns SP2 may be disposed on the same layer as each other, and the second connection patterns BP2 may be disposed on a layer different from that on which the first sensing patterns SP1 are disposed.

In an embodiment, the trace lines TL may include first trace lines TL1 and second trace lines TL2. The first trace lines TL1 may be connected to the first sensing electrodes TE1, respectively. Each of the first trace lines TL1 may be connected to the first sensing electrode TE1 in a corresponding row among the first sensing electrodes TE1 provided in the plurality of rows. The second trace lines TL2 may be connected to the second sensing electrodes TE2, respectively. Each of the second trace lines TL2 may be connected to the second sensing electrode TE2 in a corresponding column among the second sensing electrodes TE2 provided in the plurality of columns.

The second trace lines TL2 may be connected to lower ends of the second sensing electrodes TE2 adjacent to the sensing controller T-C, respectively. The second trace lines TL2 may extend from a lower end of the corresponding second sensing electrode TE2 on the non-sensing area NAA-S and then be connected to the sensing controller T-C.

As illustrated in FIG. 6, the first trace lines TL1 may be connected to left or right ends of the first sensing electrodes TE1, respectively. For example, in an embodiment each of the first trace lines TL1 connected to the first sensing electrodes TE1 in an odd row among the first trace lines TL1 may be connected to the left end of the corresponding first sensing electrode TE1 of the first sensing electrodes TE1 arranged in an odd row. Each of the first trace lines TL1 connected to the first sensing electrodes TE1 in an even row among the first trace lines TL1 may be connected to the right end of the corresponding first sensing electrode TE1 of the first sensing electrodes TE1 arranged in an even row. The first trace lines TL1 may extend from the left or right end of the corresponding first sensing electrode TE1 on the non-sensing area NAA-S in the second direction DR2 and may be connected to the sensing controller T-C.

The first trace lines TL1 may be disposed on a layer different from that on which at least a portion of the second sensing electrodes TE2 is disposed. For example, the first trace lines TL1 may be disposed on a layer different from that on which the second sensing patterns SP2 are disposed. In an embodiment, the first trace lines TL1 may be included in the first sensor conductive layer MTL1 (see FIG. 8), and the second sensing patterns SP2 may be included in the second sensor conductive layer MTL2 (see FIG. 8). However, embodiments of the present inventive concept are not necessarily limited thereto.

The sensing controller T-C may be disposed on the non-sensing area NAA-S. In an embodiment, the sensing controller T-C may be disposed adjacent to a lower end of the sensor base layer ISL1 (e.g., in a direction opposite to the second direction DR2). The sensing controller T-C may be electrically connected to the trace lines TL. The sensing controller T-C may receive a signal that may be applied to the sensing electrodes TE or a signal provided from the sensing electrodes TE through the trace lines TL. In an embodiment, the sensing controller T-C may include a controller and may generate coordinate values for a position at which an external input is provided based on the signal received from the sensing electrodes TE. However, embodiments of the present inventive concept are not necessarily limited thereto, and the sensing controller T-C may include sensing pads that are spaced apart from each other and respectively connected to trace lines TL, and the sensing pads may be portions that are electrically connected to a circuit board that provides a driving signal.

Driving signals for driving the first sensing electrodes TE1 and the second sensing electrodes TE2 may be applied from the sensing controller T-C to the first sensing electrode TE1 and the second sensing electrode TE2 through the second trace lines TL2. In an embodiment, a signal containing information sensed by the first and second sensing electrodes TE1 and TE2 may be output through the first trace lines TL1. However, embodiments of the present inventive concept are not necessarily limited thereto.

Figure 7A:
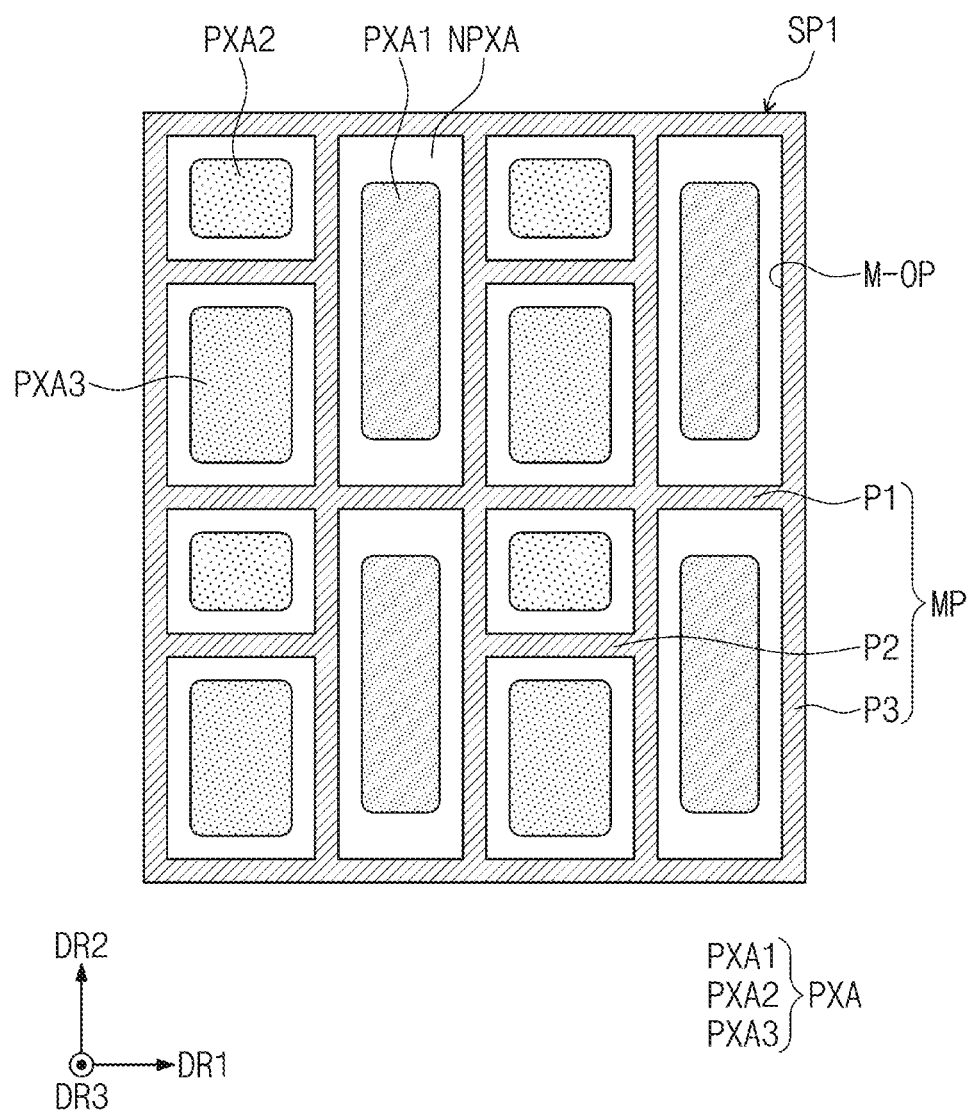
FIGS. 7A and 7B are enlarged plan views of a sensing pattern according to embodiments of the present inventive concept.
Figure 7B:
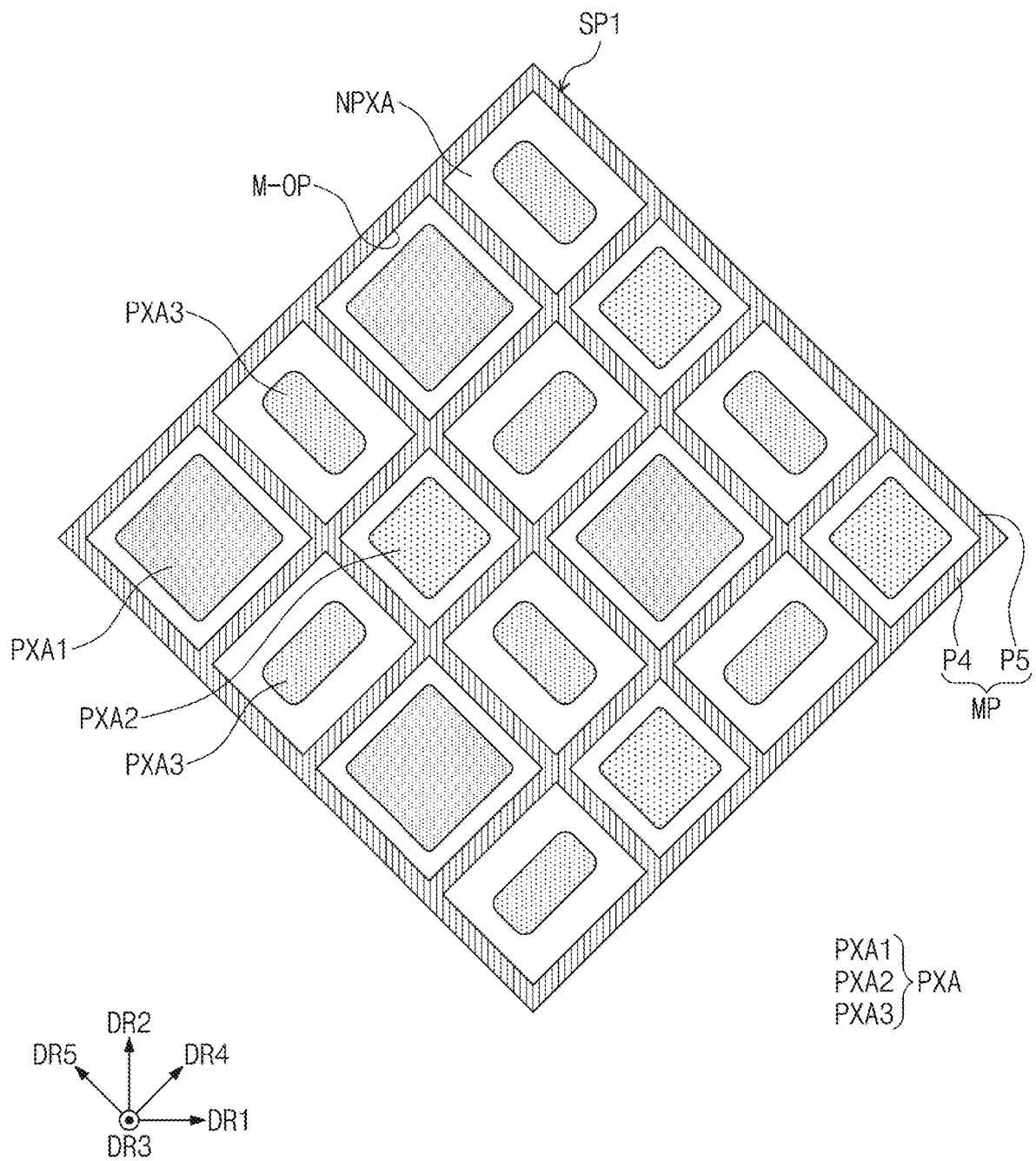

FIGS. 7A and 7B are enlarged plan views of the first sensing pattern SP1 according to embodiments of the present inventive concept. FIGS. 7A and 7B illustrate an enlarged view of a portion of the first sensing pattern SP1, but the description thereof may also be applied to the second sensing pattern SP2 (see FIG. 6). Hereinafter, the first sensing pattern SP1 will be described and referred to as the sensing pattern SP1.

The display panel DP (see FIG. 4) may include a emission area PXA and a non-emission area NPXA surrounding the emission area PXA (e.g., in a plan view). For convenience of explanation, FIGS. 7A and 7B illustrates an emission area PXA and a non-emission area NPXA overlapping the sensing pattern SP1 (e.g., in the third direction DR3). The emission area PXA may be referred to as a pixel area. The non-emission area NPXA may be referred to as a non-pixel area.

In an embodiment, the emission area PXA may include a first emission area PXA1, a second emission area PXA2, and a third emission area PXA3. In an embodiment, the first to third emission areas PXA1, PXA2, and PXA3 may be distinguished according to colors of light output through the emission areas. For example, the first emission area PXA1 may output first color light, the second emission area PXA2 may output second color light, and the third emission area PXA3 may output third color light. In an embodiment, the first to third color light may be light having different colors from each other. For example, in an embodiment the first color light may be blue light, the second color light may be red light, and the third color light may be green light. However, embodiments of the present inventive concept are not necessarily limited thereto.

The non-emission area NPXA may surround the first to third light emission areas PXA1, PXA2, and PXA3 (e.g., in a plan view). The non-emission area NPXA may set boundaries of the first to third emission areas PXA1, PXA2, and PXA3. As a result, the non-emission area NPXA may prevent the colors from being mixed between the first to third emission areas PXA1, PXA2, and PXA3.

Surface areas of the first to third emission areas PXA1, PXA2, and PXA3 may be designed in various manners depending on the colors of the output light and resolution of the display panel DP (see FIG. 4). For example, in an embodiment the surface areas of the first to third emission areas PXA1, PXA2, and PXA3 may be different from each other. For example, in the first to third emission areas PXA1, PXA2, and PXA3, the first emission area PXA1 may have the largest surface area.

Each of the first to third emission areas PXA1, PXA2, and PXA3 may have various shapes, such as polygonal, circular, or oval shape in a plan view. Here, the polygonal shape may include a polygon in a mathematical sense as well as a polygon having a curve defined at a vertex thereof. In an embodiment, the shape of the first to third emission areas PXA1, PXA2, and PXA3 may correspond to a shape of a pixel opening PX-OP (see FIG. 8) defined in a pixel defining layer PDL (see FIG. 8), and a shape of the vertex may vary depending on etching performance of the defining layer PDL (see FIG. 8).

Each of the first sensing electrodes TE1 (see FIG. 6) and the second sensing electrodes TE2 (see FIG. 6) may include a mesh pattern MP in which mesh openings M-OP are defined. The mesh openings M-OP may overlap the first to third emission areas PXA1, PXA2, and PXA3. The mesh pattern MP may not overlap the first to third emission areas PXA1, PXA2, and PXA3, and may be disposed to overlap the non-emission area NPXA (e.g., in the third direction DR3). Thus, efficiency of light emitted through the first to third emission areas PXA1, PXA2, and PXA3 of the display panel DP may not be reduced by the mesh pattern MP.

Since the first sensing electrodes TE1 (see FIG. 6) may include the mesh pattern MP, and thus, the first sensing electrodes TE1 and the second electrode CE (see FIG. 8) of the display panel DP (see FIG. 8) may be reduced compared to a comparative embodiment in which the first sensing electrodes TE1 (see FIG. 6) have an electrode shape without the mesh opening M-OP. Since the second sensing electrodes TE2 (see FIG. 6) may include the mesh pattern MP, and thus, the second sensing electrodes TE2 and the second electrode CE (see FIG. 8) of the display panel DP (see FIG. 8) may be reduced compared to a comparative embodiment in which the second sensing electrodes TE2 (see FIG. 6) have an electrode shape without the mesh opening M-OP. As a result, touch sensitivity of the touch panel TP (see FIG. 8) may be increased.

In an embodiment, each of the first emission area PXA1, the second emission area PXA2, and the third emission area PXA3 may be provided in plurality and have a predetermined arrangement on the plane. The arrangement and surface area of the mesh openings M-OP may vary to correspond to those of the first to third emission areas PXA1, PXA2, and PXA3, and thus, the shape of the mesh pattern MP may vary depending on the arrangement and surface areas of the first to third emission areas PXA1, PXA2, and PXA3.

Referring to FIG. 7A, in an embodiment each of the first emission area PXA1 and the third emission area PXA3 may extend longitudinally in the second direction DR2. Each of the first emission area PXA1 and the third emission area PXA3 may include relatively long sides extending in the second direction DR2. In the second direction DR2, a length of the first emission area PXA1 may be greater than that of the third emission area PXA3. The second emission area PXA2 may include relatively long sides extending longitudinally in the first direction DR1. In an embodiment, in the second direction DR2, a length of the second emission area PXA2 may be less than that of each of the first emission area PXA1 and the third emission area PXA3.

Each of the first to third emission areas PXA1, PXA2, and PXA3 may be provided in plurality. In an embodiment, the second emission areas PXA2 and the third emission areas PXA3 may be alternately arranged in the second direction DR2 to form a first row, and the first emission areas PXA1 may be arranged in the second direction DR2 to form a second row. The first row and the second row may be alternately arranged in the first direction DR1. In the first direction DR1, each of the first emission areas PXA1 may overlap at least a portion of the second emission area PXA2 and the third emission area PXA3.

In an embodiment, the mesh pattern MP may include a first line part P1, a second line part P2, and a third line part P3. The first to third line parts P1, P2, and P3 may have an integrated shape. For example, in an embodiment the first to third line parts P1, P2, and P3 may be integrally formed with each other. The first to third line parts P1, P2, and P3 may be connected to each other to define the mesh openings M-OP that overlap the first to third emission areas PXA1, PXA2, and PXA3. The first to third line parts P1, P2, and P3 may be portions that are provided by patterning the mesh openings M-OP in the integrated conductive layer. The first to third line parts P1, P2, and P3 may be disposed on the non-emission area NPXA and may have a shape surrounding the first to third emission areas PXA1, PXA2, and PXA3 (e.g., in a plan view).

Each of the first line part P1 and the second line part P2 may correspond to a portion of the mesh pattern MP extending in the first direction DR1. In an embodiment, the first line part P1 may be disposed between adjacent first emission areas PXA1 and between adjacent second emission areas PXA2 and the third emission areas PXA3 facing each other in the second direction DR2. The second line part P2 may overlap the first emission area PXA1 in the first direction DR1 and may be disposed between the second emission area PXA2 and the third emission area PXA3, which are adjacent to each other in the second direction DR2.

The third line part P3 may correspond to a portion of the mesh pattern MP extending in the second direction DR2.

The third line part P3 may extend longitudinally from the first line part P1 in the second direction DR2. The third line part P3 may be disposed between adjacent first emission areas PXA1 and second emission areas PXA2 and between adjacent first emission areas PXA1 and third emission areas PXA3 in the first direction DR1.

Referring to FIG. 7B, the first emission area PXA1 and the second emission area PXA2 may have a substantially diamond shape in an plan view. In an embodiment, the third emission area PXA3 may include two types of third emission areas PXA3 of which relatively long sides extend longitudinally in different directions from each other. The third emission area PXA3 may include relatively long sides extending longitudinally in a fourth direction DR4 or a fifth direction DR5.

In an embodiment, the fourth direction DR4 may be a direction that intersects each of the first direction DR1 and the second direction DR2 on the plane defined by the first direction DR1 and the second direction DR2. The fifth direction DR5 may be a direction that intersects each of the first direction DR1, the second direction DR2, and the fourth direction DR4 on the plane defined by the first direction DR1 and the second direction DR2.

Each of the first to third emission areas PXA1, PXA2, and PXA3 may be provided in plurality. In an embodiment, the first emission areas PXA1 and the second emission areas PXA2 may be alternately arranged in the first direction DR1 and the second direction DR2. The first emission areas PXA1 and the third emission areas PXA3 extending longitudinally in the fifth direction DR5 may be alternately arranged in the fourth direction DR4, and the first emission areas PXA1 and the third emission areas PXA3 extending longitudinally in the fourth direction DR4 may be alternately arranged in the fifth direction DR5. The second emission areas PXA2 and the third emission areas PXA3 extending longitudinally in the fourth direction DR4 may be alternately arranged in the fourth direction DR4, and the second emission areas PXA2 and the third emission areas PXA3 extending longitudinally in the fifth direction DR5 may be alternately arranged in the fifth direction DR5.

The mesh pattern MP may include a fourth line part P4 and a fifth line part P5. The fourth line part P4 and the fifth line part P5 have an integrated shape connected to each other and have mesh openings M-OP overlapping the first to third emission areas PXA1, PXA2, and PXA3. In an embodiment, the fourth line part P4 and the fifth line part P5 may be portions provided by patterning the mesh openings M-OP in the integrated conductive layer. The fourth line part P4 and the fifth line part P5 may be disposed on the non-emission area NPXA and may have a shape surrounding the first to third emission areas PXA1, PXA2, and PXA3 (e.g., in a plan view).

In an embodiment, the fourth line part P4 may correspond to a portion of the mesh pattern MP extending longitudinally in the fourth direction DR4. The fifth line part P5 may correspond to a portion of the mesh pattern MP extending longitudinally in the fifth direction DR5. The fourth line part P4 and the fifth line part P5 may be arranged to intersect each other in a plan view.

However, embodiments of the present inventive concept are not necessarily limited thereto and the arrangement and shapes of the emission areas PXA1, PXA2, and PXA3 and the shape of the mesh pattern MP may vary from those illustrated in FIGS. 7A and 7B.

Figure 8:
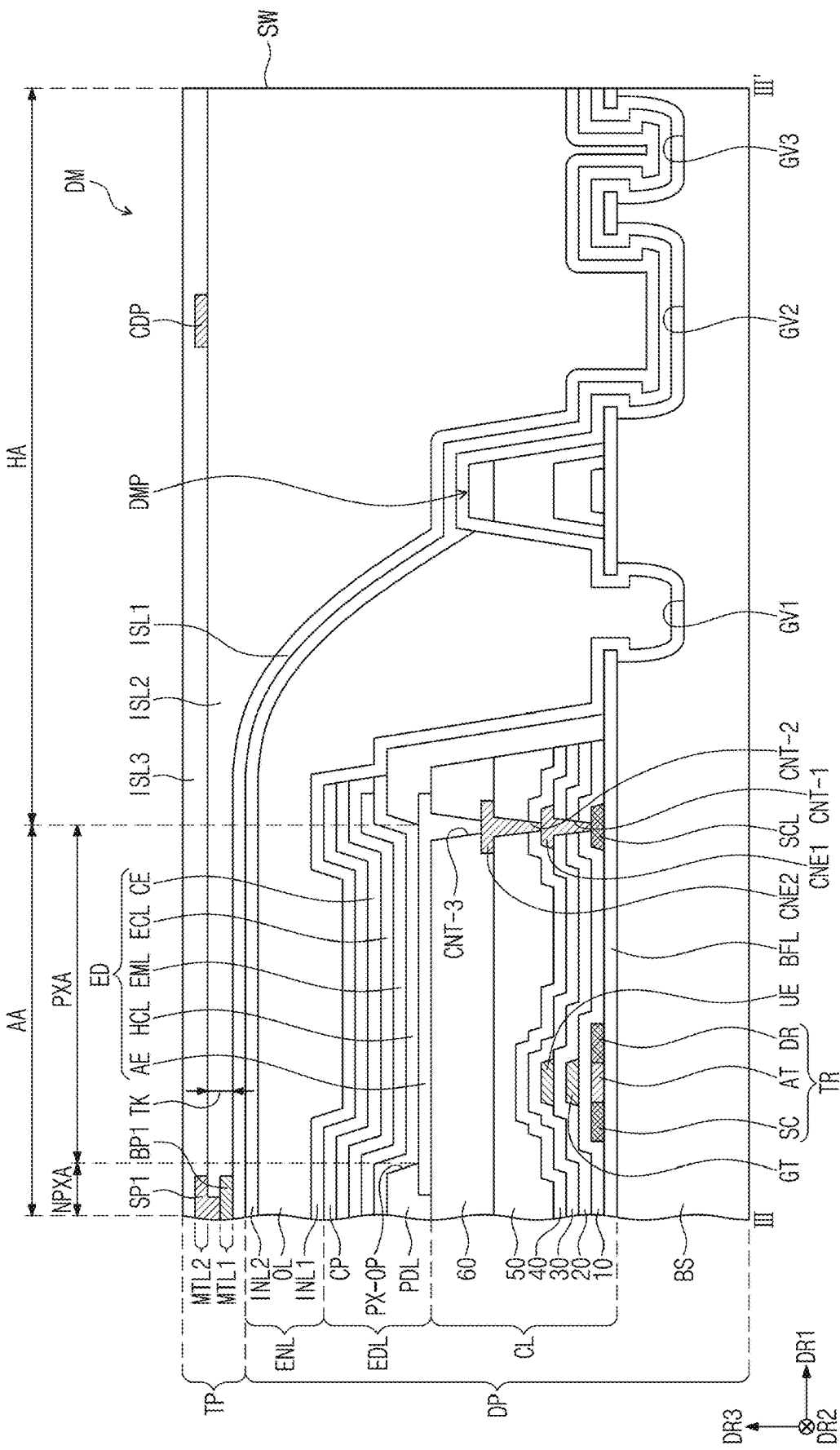
FIG. 8 is a cross-sectional view of a display module according to an embodiment of the present inventive concept.

FIG. 8 is a cross-sectional view of the display module according to an embodiment of the present inventive concept. FIG. 8 is a cross-sectional view of a portion corresponding to a line III-III' of FIG. 2. The contents described above in FIGS. 5A to 7B may be applied to the touch panel TP of FIG. 8 in the same manner.

The display module 100 may include a display panel DP and a touch panel TP. The display panel DP may include a through-hole corresponding to the through-hole HH (see FIG. 2) of the display module DM. The touch panel TP may include a through-hole corresponding to the through-hole HH (see FIG. 2) of the display module DM. The through-hole of the display panel DP and the through-hole of the touch panel TP may overlap each other (e.g., in the third direction DR3). In an embodiment, the through-hole HH (see FIG. 2) may be defined by a sidewall SW, and the sidewall SW may be defined by removing a portion of each of the display panel DP and the touch panel TP.

In an embodiment, the display panel DP may include a base layer BS, a circuit layer CL, a light emitting element layer EDL, and an encapsulation layer ENL. In an embodiment, the circuit layer CL and the light emitting element layer EDL may include a plurality of insulating layers, a semiconductor pattern, a conductive pattern, and a signal line. In an embodiment, the insulating layer, the semiconductor layer, and the conductive layer may be provided in a manner such as coating, deposition, and the like. Thereafter, the insulating layer, the semiconductor layer and the conductive layer may be selectively patterned in a photolithography manner. In this manner, the semiconductor pattern, the conductive pattern, the signal line, and the like, which are provided in the circuit layer CL and the light emitting element layer EDL may be provided. In an embodiment, the encapsulation layer ENL covering the light emitting element layer EDL may then be provided.

A plurality of grooves GV1, GV2, and GV3 may be provided in the base layer BS. In FIG. 8, the plurality of grooves GV1, GV2, and GV3 are illustrated as including a first groove GV1, a second groove GV2, and a third groove GV3. However, embodiments of the present inventive concept are not necessarily limited thereto and the number of grooves GV1, GV2, and GV3 may vary.

In an embodiment, each of the plurality of grooves GV1, GV2, and GV3 may have a concave shape that is concavely recessed from a top surface of the base layer BS. In a plan view, each of the plurality of grooves GV1, GV2, and GV3 may have a shape surrounding the sidewall SW defining the through-hole HH (see FIG. 2). The first to third grooves GV1, GV2, and GV3 may prevent the elements disposed on the active area AA (see FIG. 2) from being damaged by blocking a penetration path of external moisture or oxygen.

At least one inorganic layer may be disposed on a top surface of the base layer BS (e.g., disposed directly thereon in the third direction DR3). In an embodiment, the inorganic layer may include at least one of aluminum oxide, titanium oxide, silicon oxide silicon oxynitride, zirconium oxide, or hafnium oxide. In some embodiments, the inorganic layer may be provided as a multilayer. The multilayered inorganic layer may constitute a barrier layer and/or a buffer layer. In an embodiment shown in FIG. 8, the display panel DP is shown as including a buffer layer BFL for the at least one inorganic layer.

The buffer layer BFL may increase bonding force between the base layer BS and the semiconductor pattern. In an embodiment, the buffer layer BFL may include a silicon oxide layer and a silicon nitride layer, and the silicon oxide layer and the silicon nitride layer may be alternately laminated (e.g., in the third direction DR3).

The semiconductor pattern is disposed on the buffer layer BFL (e.g., disposed directly thereon in the third direction DR3). In an embodiment, the semiconductor pattern may include polysilicon. However, embodiments of the present inventive concept are not necessarily limited thereto. For example, in some embodiments the semiconductor pattern may include amorphous silicon or metal oxide.

FIG. 8 illustrates merely a portion of the semiconductor pattern. For example, the semiconductor pattern may be further disposed on other areas. In an embodiment, the semiconductor patterns may be arranged according to a specific rule. The semiconductor pattern has different electrical properties depending on whether the semiconductor pattern is doped. The semiconductor pattern may include a doped region and a non-doped region. The doped region may be doped with an N-type dopant or a P-type dopant. A P-type transistor may include a doped region doped with the P-type dopant, and an N-type transistor may include a doped region doped with the N-type dopant.

The doped region may have conductivity greater than that of a non-doped region and may substantially act as an electrode or a signal line. The non-doped region may substantially correspond to an active (e.g., a channel) of the transistor. For example, in an embodiment a portion of the semiconductor pattern may be an active of the transistor, another portion may be a source or drain of the transistor, and further another portion may be a connection electrode or a connection signal line.

As illustrated in FIG. 8, a source SC, an active AT, and a drain DR of a transistor TR may be formed from a semiconductor pattern. The source SC and the drain DR may extend in opposite directions from the active AL in a cross-sectional view. FIG. 8 illustrates a portion of a connection signal line SCL formed from the semiconductor pattern. In an embodiment, the connection signal line SCL may be connected to the drain DR of the transistor TR on the plane.

A first insulating layer 10 may be disposed on the buffer layer BFL (e.g., disposed directly thereon in the third direction DR3). The first insulating layer 10 commonly overlaps the plurality of pixels PX to cover the semiconductor pattern. The first insulating layer 10 may include an inorganic layer and/or an organic layer and have a single-layered or multilayered structure. In an embodiment, the first insulating layer 10 may include at least one of oxide, titanium oxide, silicon oxide, silicon oxide nitride, zirconium oxide, or hafnium oxide. In this embodiment, the first insulating layer 10 may include a single-layered silicon oxide layer. The insulating layer of the circuit layer CL, which will be described later, as well as the first insulating layer 10 may be an inorganic layer and/or an organic layer and may have a single-layered or a multilayered structure. The inorganic layer may include at least one of the above-described materials. However, embodiments of the present inventive concept are not necessarily limited thereto.

The gate GT may be disposed on the first insulating layer 10 (e.g., disposed directly thereon in the third direction DR3). The gate GT may be a portion of a metal pattern. The gate GT may overlap the active AT (e.g., in the third direction DR3). In an embodiment, in the process of doping the semiconductor pattern, the gate GT may function as a mask.

The second insulating layer 20 may be disposed on (e.g., disposed directly thereon in the third direction DR3) the first insulating layer 10 to cover the gate GT. A second insulating layer 20 may commonly overlap the pixels. The second insulating layer 20 may be an inorganic layer and/or an organic layer and have a single-layered or multilayered structure. In this embodiment, the first insulating layer 20 may include a single-layered silicon oxide layer.

The upper electrode UE may be disposed on the second insulating layer 20 (e.g., disposed directly thereon in the third direction DR3). The upper electrode UE may overlap the gate GT of the transistor TR (e.g., in the third direction DR3). The upper electrode UE may be a portion of the metal pattern. A portion of the gate GT and the upper electrode UE overlapping the gate GT may define a capacitor. However, embodiments of the present inventive concept are not necessarily limited thereto. For example, in an embodiment the upper electrode UE may be omitted.

The third insulating layer 30 may be disposed on the second insulating layer 20 (e.g., disposed directly thereon in the third direction DR3) to cover the upper electrode UE. In this embodiment, the third insulating layer 30 may include a single-layered silicon oxide layer.

A first connection electrode CNE1 may be disposed on the third insulating layer 30 (e.g., disposed directly thereon in the third direction DR3). In an embodiment, the first connection electrode CNE1 may be connected to (e.g., directly connected thereto) the signal line SCL through a contact hole CNT-1 passing through the first to third insulating layers 10, 20, and 30.

A fourth insulating layer 40 may be disposed on the third insulating layer 30 (e.g., disposed directly thereon in the third direction DR3). In an embodiment, the fourth insulating layer 40 may be a single-layered silicon oxide layer. A fifth insulating layer 50 may be disposed on the fourth insulating layer 40 (e.g., disposed directly thereon in the third direction DR3). In an embodiment, the fifth insulating layer 50 may be an organic layer.

A second connection electrode CNE2 may be disposed on the fifth insulating layer 50 (e.g., disposed directly thereon in the third direction DR3). In an embodiment, the second connection electrode CNE2 may be connected to (e.g., directly connected thereto) the first connection electrode CNE1 through a contact hole CNT-2 passing through the fourth insulating layer 40 and the fifth insulating layer 50.

A sixth insulating layer 60 may be disposed on the fifth insulating layer 50 (e.g., disposed directly thereon in the third direction DR3) to cover the second connection electrode CNE2. In an embodiment, the sixth insulating layer 60 may be an organic layer.

A protrusion DMP may be disposed between the first groove GV1 and the second groove GV2 (e.g., in the first direction DR1). The protrusion DMP may also be referred to as a dam part. In an embodiment, the protrusion DMP may be constituted by a plurality of insulating layers. The protrusion DMP may prevent an encapsulation organic layer OL, which will be described later, from being expanded. In addition, although FIG. 8 illustrates an embodiment in which two dam parts DMP are provided, embodiments of the present inventive concept are not necessarily limited thereto and the number of dam parts DMP may vary.

The light emitting element layer EDL including the light emitting element ED may be disposed on the circuit layer CL (e.g., disposed directly thereon in the third direction DR3). In an embodiment, the light emitting element ED may include a first electrode AE, a hole control layer HCL, an emission layer EML, an electron control layer ECL, and a second electrode CE.

The first electrode AE may be disposed on the sixth insulating layer 60 (e.g., disposed directly thereon in the third direction DR3). In an embodiment, the first electrode AE may be connected to (e.g., directly connected thereto)

the second connection electrode CNE2 through a contact hole CNT-3 passing through the sixth insulating layer 60.

A pixel defining layer PDL may be disposed on the sixth insulating layer 60 (e.g., disposed directly thereon in the third direction DR3) to cover a portion of the first electrode AE. A pixel opening PX-OP may be defined in the pixel defining layer PDL. The pixel opening PX-OP of the pixel defining layer PDL may expose at least a portion of the first electrode AE. For example, in an embodiment the pixel defining layer PDL may cover lateral ends of the first electrode AE and the pixel opening PX-OP may expose a central portion of the first electrode AE. In this embodiment, the emission area PXA may be defined to correspond to a portion of an area of the first electrode AE, which is exposed by the opening PX-OP.

In an embodiment, the hole control layer HCL may be disposed on the first electrode AE (e.g., disposed directly thereon in the third direction DR3). In an embodiment, a hole control layer HCL may be commonly disposed on the emission area PXA and the non-emission area NPXA. The hole control layer HCL may include a hole transport layer and/or a hole injection layer.

The emission layer EML may be disposed on the hole control layer HCL (e.g., disposed directly thereon in the third direction DR3). The emission layer EML may be disposed on an area corresponding to the pixel opening PX-OP. For example, in an embodiment the emission layer EML may be provided separately in each of the pixels, such as in the emission area PXA (see FIGS. 7A and 7B). However, embodiments of the present inventive concept are not necessarily limited thereto, and the emission layer EML may be disposed in common in the emission area PXA and the non-emission area NPXA. In an embodiment in which the emission layer EML is disposed to be separated from each of the pixels, each of the emission layers EML may emit light having at least one of blue, red, or green color. In an embodiment in which the emission layer EML is commonly disposed on the pixels, the emission layer EML may provide blue light or white light.

The electron control layer ECL may be disposed on the emission layer EML (e.g., disposed directly thereon in the third direction DR3). The charge control layer OL may include an electron transport layer and/or an electron injection layer. In an embodiment, the hole control layer HCL and the electron control layer ECL may be commonly formed in the plurality of pixels by using an open mask.

The second electrode CE may be disposed on the electronic control layer ECL (e.g., disposed directly thereon in the third direction DR3). In an embodiment, the second electrode CE may have an integrated shape and be commonly disposed on the plurality of pixels.

The capping layer CP may be disposed on the second electrode CE and may be in direct contact with the second electrode CE. In an embodiment, the capping layer CP may include an organic material. The capping layer CP may protect the second electrode CE in subsequent processes, such as a sputtering process and increase light emission efficiency of the light emitting device ED. In an embodiment, the capping layer CP may have a refractive index greater than that of a first encapsulation inorganic layer INL1, which will be described later. However, embodiments of the present inventive concept are not necessarily limited thereto. In some embodiments, the capping layer CP may be omitted.

The encapsulation layer ENL may be disposed on the light emitting element layer EDL (e.g., disposed directly thereon in the third direction DR3). In an embodiment, the encapsulation layer ENL may include a first inorganic encapsulation layer INL1, an organic encapsulation layer OL, and a second inorganic encapsulation layer INL2 (e.g., consecutively stacked in the third direction DR3). The first encapsulation inorganic layer INL1 and the second encapsulation inorganic layer INL2 may protect the light emitting element layer EDL from moisture/oxygen, and the encapsulation organic layer OL may protect the light emitting element layer EDL from foreign substances such as dust particles. In an embodiment, each of the first inorganic encapsulation layer INL1 and the second inorganic encapsulation layer INL2 may include a silicon nitride layer, a silicon oxy nitride layer, a silicon oxide layer, a titanium oxide layer, or an aluminum oxide layer. The organic encapsulation layer OL may include an acrylic-based organic layer. However, embodiments of the present disclosure are not necessarily limited thereto.

The touch panel TP may be disposed on the display panel DP (e.g., in the third direction DR3). In an embodiment, the touch panel TP may include a base insulating layer ISL1, a first sensor conductive layer MTL1, a sensing insulating layer ISL2, a second sensor conductive layer MTL2, and a cover insulating layer ISL3. In an embodiment, the touch panel TP may be formed by a continuous process after forming the display layer DP and may be disposed directly on the display layer DP (e.g., in the third direction DR3).

The base insulating layer ISL1 may be directly disposed on the display panel DP and may be directly disposed between the display panel DP and the sensing insulating layer ISL2 (e.g., in the third direction DR3). For example, the base insulating layer ISL1 may be in direct contact with the second encapsulation inorganic layer INL2. The base insulating layer ISL1 may have a single-layer or multilayer structure.

Each of the first sensor conductive layer MTL1 and the second sensor conductive layer MTL2 may have a single-layered structure or a multilayered structure in which a plurality of layers are laminated in the third directional axis DR3. The conductive layer having the single-layered structure may include a metal layer or a transparent conductive layer.

In an embodiment, the metal layer may be formed of molybdenum, silver, titanium, copper, aluminum, and an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymers such as PEDOT, metal nanolines, graphene or the like.

The conductive layer having the multilayer structure may include multilayer metal layers. The multilayer metal layers may have a three-layer structure of titanium/aluminum/titanium. The conductive layer having the multilayered structure may include at least one metal layer and at least one transparent conductive layer.

The first sensor conductive layer MTL1 and the second sensor conductive layer MTL2 may include first sensing patterns SP1, first connection patterns BP1, second sensing patterns SP2 (see FIG. 6), second connection patterns BP2 (see FIG. 6), and a cutting inspection pattern CDP. For example, in an embodiment the first sensor conductive layer MTL1 may include first connection patterns BP1, and the second sensor conductive layer MTL2 may include first sensing patterns SP1 and second sensing patterns SP2 (see FIG. 6), second connection patterns BP2 (see FIG. 6), and a cutting inspection pattern CDP. The cutting inspection pattern CDP may refer to the second sensor conductive layer MTL2 disposed in the hole area HA and may have the same pattern as the second sensor conductive layer MTL2 disposed on the active area AA on the plane. For example, in an embodiment, the cutting inspection pattern CDP may include a mesh pattern MP in which mesh openings M-OP are defined, as will be described later.

However, embodiments of the present inventive concept are not necessarily limited thereto, and the elements constituting each of the first sensor conductive layer MTL1 and the second sensor conductive layer MTL2 may vary. For example, in an embodiment the first sensor conductive layer MTL1 may include first sensing patterns SP1, second sensing patterns SP2 (see FIG. 6), and second connection patterns BP2 (see FIG. 6), and the second sensor conductive layer MTL2 may include first connection patterns BP1 and a cutting inspection pattern CDP.

The sensing insulating layer ISL2 may be disposed between the first sensor conductive layer MTL1 and the second sensor conductive layer MTL2 (e.g., in the third direction DR3) and may cover the first sensor conductive layer MTL1. In an embodiment, some components of the second sensor conductive layer MTL2 may be electrically connected to some components of the first sensor conductive layer MTL1 through the contact hole passing through the sensing insulating layer ISL2.

The cover insulating layer ISL3 may be disposed on the second sensor conductive layer MTL2 (e.g., disposed directly thereon in the third direction DR3) and cover the second sensor conductive layer MTL2. In an embodiment, the cover insulating layer ISL3 may include the same material as the sensing insulating layer ISL2 and may have the same dielectric constant as the sensing insulating layer ISL2.

As described above, the display device according to an embodiment of the present inventive concept may include the sensing insulating layer including the siloxane-based polymer having the low dielectric constant to provide the display device having the improved RC delay, the increased touch sensitivity, and the increased processability.

It will be apparent to those skilled in the art that various modifications and variations can be made to the described, non-limiting embodiments of the present inventive concept. Thus, it is intended that the present disclosure covers the modifications and variations of embodiment of the present inventive concept. Therefore, the technical scope of the present inventive concept is not limited to the contents of the embodiments described in the detailed description of the specification.

What is claimed is:

1. A display device comprising:
a display panel; and
a touch panel disposed on the display panel, the touch panel comprising a sensing area and a hole area having a through-hole defined therein, the hole area is surrounded by the sensing area in a plan view,
wherein the sensing area comprises:
a first sensor conductive layer disposed on the display panel;
a sensing insulating layer disposed on the first sensor conductive layer; and
a second sensor conductive layer disposed on the sensing insulating layer,
wherein at least one of the first sensor conductive layer and the second sensor conductive layer comprises a mesh opening,
the sensing insulating layer comprises a siloxane-based polymer, and
the sensing insulating layer has a dielectric constant in a range of about 2 to about 3.3.

2. The display device of claim 1, wherein the sensing insulating layer has a thickness in a range of about 1 μm to about 5 μm.

3. The display device of claim 1, wherein the sensing area further comprises a base insulating layer disposed between the display panel and the first sensor conductive layer.

4. The display device of claim 1, wherein:
the sensing insulating layer is disposed on the display panel in the hole area; and
the second sensor conductive layer is disposed on the sensing insulating layer in the hole area,
wherein the second sensor conductive layer in the hole area comprises the mesh opening.

5. The display device of claim 4, wherein the hole area further comprises a base insulating layer that is directly disposed between the display panel and the sensing insulating layer.

6. The display device of claim 1, wherein the second sensor conductive layer is directly disposed on the sensing insulating layer.

7. The display device of claim 1, wherein:
the touch panel further comprises a cover insulating layer disposed on the second sensor conductive layer; and
the cover insulating layer comprises a same material as the sensing insulating layer.

8. The display device of claim 1, wherein the first sensor conductive layer comprises:
first sensing patterns, each of the first sensing patterns is disposed in a first direction; and
second sensing patterns, each of the second sensing patterns is disposed in a second direction crossing the first direction.

9. The display device of claim 1, wherein:
the display panel comprises a display area corresponding to the sensing area of the touch panel; and
the display panel comprises a light emitting element in the display area.

10. A display device comprising:
a display panel; and
a touch panel disposed on the display panel, the touch panel comprising a sensing area and a hole area having a through-hole defined therein, the hole area is surrounded by the sensing area in a plan view,
wherein the hole area comprises:
a sensing insulating layer disposed on the display panel; and
a second sensor conductive layer disposed on the sensing insulating layer,
wherein the second sensor conductive layer comprises a mesh opening,
the sensing insulating layer comprises a siloxane-based polymer, and
the sensing insulating layer has a dielectric constant in a range of about 2 to about 3.3.

11. The display device of claim 10, wherein the hole area further comprises a base insulating layer directly disposed between the display panel and the sensing insulating layer.

12. The display device of claim 10, wherein:
a first sensor conductive layer is disposed on the display panel in the sensing area;
the sensing insulating layer is disposed on the first sensor conductive layer in the sensing area; and
the second sensor conductive layer is disposed on the sensing insulating layer in the sensing area, wherein at least one of the first sensor conductive layer or the second sensor conductive layer comprises a mesh opening in the sensing area.

13. The display device of claim 12, wherein the sensing insulating layer of the sensing area has a thickness in a range of about 1 to about 5 μm.

14. The display device of claim 12, wherein the sensing area further comprises a base insulating layer disposed between the display panel and the first sensor conductive layer.

15. The display device of claim 12, wherein the first sensor conductive layer comprises:
first sensing patterns, each of the first sensing patterns is disposed in a first direction; and
second sensing patterns, each of the second sensing patterns is disposed in a second direction crossing the first direction.

16. The display device of claim 10, wherein the second sensor conductive layer is directly disposed on the sensing insulating layer.

17. The display device of claim 10, wherein:
the touch panel further comprises a cover insulating layer disposed on the second sensor conductive layer; and
the cover insulating layer comprises a same material as the sensing insulating layer.

18. The display device of claim 10, wherein:
the display panel comprises a display area corresponding to the sensing area of the touch panel; and
the display panel comprises a light emitting element in the display area.

19. A display device comprising:
a display panel; and
a touch panel disposed on the display panel, the touch panel comprising a sensing area and a hole area having a through-hole defined therein, the hole area is surrounded by the sensing area in a plan view,
wherein the touch panel comprises:
a base insulating layer;
first sensing patterns disposed on the base insulating layer, each of the first sensing patterns is disposed in a first direction; and
second sensing patterns disposed on the base insulating layer, each of the second sensing patterns is disposed in a second direction crossing the first direction;
first connection patterns connecting the first sensing patterns to each other and disposed between the base insulating layer and the first sensing patterns;
second connection patterns disposed on the base insulating layer, the second connection patterns connecting the second sensing patterns to each other; and
a sensing insulating layer disposed between the base insulating layer, and the first sensing patterns, the second sensing patterns and the second connection patterns,
wherein the first sensing patterns, the second sensing patterns, and the second connection patterns are disposed in the sensing area and the hole area,
the first connection patterns are disposed in the sensing area,
the sensing insulating layer comprises a siloxane-based polymer, and
the sensing insulating layer has a dielectric constant in a range of about 2 to about 3.3.

20. The display device of claim 19, wherein:
the touch panel further comprises a cover insulating layer disposed on the first sensing patterns, the second sensing patterns and the second connection patterns; and
the cover insulating layer comprises a same material as the sensing insulating layer.

* * * * *